US011782438B2

(12) United States Patent
Bentahar et al.

(10) Patent No.: US 11,782,438 B2
(45) Date of Patent: Oct. 10, 2023

(54) APPARATUS AND METHOD FOR POST-PROCESSING A DECISION-MAKING MODEL OF AN AUTONOMOUS VEHICLE USING MULTIVARIATE DATA

(71) Applicant: Nissan North America, Inc., Franklin, TN (US)

(72) Inventors: Omar Bentahar, Sunnyvale, CA (US); Arec Jamgochian, Stanford, CA (US); Kyle Hollins Wray, Fremont, CA (US); Stefan Witwicki, San Carlos, CA (US)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 241 days.

(21) Appl. No.: 16/821,218

(22) Filed: Mar. 17, 2020

(65) Prior Publication Data
US 2021/0294323 A1  Sep. 23, 2021

(51) Int. Cl.
*G05D 1/00* (2006.01)
*B60W 60/00* (2020.01)
(Continued)

(52) U.S. Cl.
CPC ........... *G05D 1/0088* (2013.01); *B60W 50/00* (2013.01); *B60W 60/001* (2020.02); *G06N 20/00* (2019.01);
(Continued)

(58) Field of Classification Search
CPC ......... G05D 1/0088; G05D 2201/0213; G06N 20/00; G06N 7/005; B60W 50/00;
(Continued)

(56) References Cited

U.S. PATENT DOCUMENTS 4,751,570 A   6/1988 Robinson
5,615,116 A   3/1997 Gudat et al.
(Continued)

FOREIGN PATENT DOCUMENTS

CN   103945486 A   7/2014
CN   105216795 A   1/2016
(Continued)

OTHER PUBLICATIONS

K. Tang, S. Zhu, Y. Xu and F. Wang, "Modeling Drivers' Dynamic Decision-Making Behavior During the Phase Transition Period: An Analytical Approach Based on Hidden Markov Model Theory," IEEE Transactions on Intelligent Transportation Systems, vol. 17, No. 1, pp. 206-214, Jan. 2016 (Year: 2016).*
(Continued)

*Primary Examiner* — Aniss Chad
*Assistant Examiner* — Christine Nguyen Huynh
(74) *Attorney, Agent, or Firm* — Young Basile Hanlon & MacFarlane, P.C.

(57) ABSTRACT

An apparatus for post-processing of a decision-making model of an autonomous vehicle receives a decision-making model including a plurality of states. The model is processed using multivariate data that comprises values for at least three observations of a vehicle operational scenario. A slice of the model decision space is generated by fixing values of all except two observations, and modifying the values of the two observations to obtain multiple alternative solutions for the model. The alternative solutions and the modified values form the slice. Each alternative solution is associated with a respective first value of a first observation and a respective second value of a second observation. The apparatus also generates a solution to a modified decision-making model that is the model modified by, for at least one state and at
(Continued)

least one of the two observations, modifying a probabilistic transition matrix, a probabilistic observation matrix, or both.

20 Claims, 7 Drawing Sheets
(3 of 7 Drawing Sheet(s) Filed in Color)

(51) Int. Cl.
*B60W 50/00* (2006.01)
*G06N 20/00* (2019.01)
(52) U.S. Cl.
CPC . *B60W 2050/0028* (2013.01); *B60W 2420/52* (2013.01); *G05D 2201/0213* (2013.01)
(58) Field of Classification Search
CPC ....... B60W 60/001; B60W 2050/0028; B60W 2420/52; B60W 2554/4029; B60W 30/08; B60W 30/18163; B60W 30/18154
See application file for complete search history.

(56) References Cited

U.S. PATENT DOCUMENTS

| | | | |
|---|---|---|---|
| 6,076,034 A | 6/2000 | Satoh et al. |
| 8,762,006 B2 | 6/2014 | Miller |
| 8,781,669 B1 | 7/2014 | Teller et al. |
| 8,849,483 B2 | 9/2014 | Kuwata et al. |
| 8,884,782 B2 | 11/2014 | Rubin et al. |
| 9,081,651 B2 | 7/2015 | Filev et al. |
| 9,103,671 B1 | 8/2015 | Breed et al. |
| 9,134,731 B2 | 9/2015 | Healey et al. |
| 9,494,439 B1 | 11/2016 | Ross et al. |
| 9,568,915 B1 | 2/2017 | Berntorp et al. |
| 9,646,428 B1 | 5/2017 | Konrardy et al. |
| 9,972,054 B1 | 5/2018 | Konrardy et al. |
| 10,029,701 B2 | 7/2018 | Gordon et al. |
| 10,061,326 B2 | 8/2018 | Gordon et al. |
| 10,093,322 B2 | 10/2018 | Gordon et al. |
| 10,126,135 B2 | 11/2018 | Mortazavi et al. |
| 10,185,998 B1 | 1/2019 | Konrardy et al. |
| 10,254,759 B1 | 4/2019 | Faust et al. |
| 10,319,039 B1 | 6/2019 | Konrardy et al. |
| 10,371,130 B2 | 8/2019 | Deng et al. |
| 10,380,886 B2 | 8/2019 | Ran et al. |
| 10,408,638 B2 | 9/2019 | Berntorp et al. |
| 10,514,705 B2 | 12/2019 | Shalev-Shwartz et al. |
| 10,518,764 B2 | 12/2019 | Cao et al. |
| 10,538,252 B2 | 1/2020 | Ebina et al. |
| 10,543,828 B2 | 1/2020 | Stayton et al. |
| 10,599,155 B1 | 3/2020 | Konrardy et al. |
| 10,990,096 B2 | 4/2021 | Isele et al. |
| 11,037,320 B1 | 6/2021 | Ebrahimi Afrouzi et al. |
| 2004/0068351 A1 | 4/2004 | Solomon |
| 2005/0057370 A1 | 3/2005 | Warrior et al. |
| 2007/0021915 A1 | 1/2007 | Breed et al. |
| 2007/0168096 A1 | 7/2007 | Boutin |
| 2008/0097699 A1 | 4/2008 | Ono |
| 2009/0088916 A1 | 4/2009 | Elgersma et al. |
| 2009/0140887 A1 | 6/2009 | Breed et al. |
| 2009/0299496 A1 | 12/2009 | Cade |
| 2009/0326819 A1 | 12/2009 | Taguchi |
| 2010/0223216 A1 | 9/2010 | Eggert et al. |
| 2011/0016067 A1 | 1/2011 | Levchuk et al. |
| 2011/0102195 A1 | 5/2011 | Kushi et al. |
| 2012/0150437 A1 | 6/2012 | Zeng et al. |
| 2012/0233102 A1 | 9/2012 | James |
| 2012/0290152 A1 | 11/2012 | Cheung et al. |
| 2013/0318023 A1 | 11/2013 | Morimura et al. |
| 2014/0067483 A1* | 3/2014 | Jeong ............... G06Q 10/06393 705/7.39 |
| 2014/0136414 A1 | 5/2014 | Abhyanker |
| 2014/0201838 A1 | 7/2014 | Varsanyi et al. |
| 2014/0222277 A1 | 8/2014 | Tsimhoni et al. |
| 2014/0244114 A1 | 8/2014 | Matsubara |
| 2014/0309838 A1 | 10/2014 | Ricci |
| 2015/0039157 A1 | 2/2015 | Wolfe et al. |
| 2015/0070156 A1 | 3/2015 | Milburn, Jr. |
| 2015/0081156 A1 | 3/2015 | Trepagnier et al. |
| 2015/0105961 A1 | 4/2015 | Callow |
| 2015/0106010 A1 | 4/2015 | Martin et al. |
| 2015/0153735 A1 | 6/2015 | Clarke et al. |
| 2015/0183431 A1 | 7/2015 | Nanami |
| 2015/0210274 A1 | 7/2015 | Clarke et al. |
| 2015/0253772 A1 | 9/2015 | Solyom et al. |
| 2015/0329130 A1 | 11/2015 | Carlson et al. |
| 2015/0345966 A1 | 12/2015 | Meuleau |
| 2015/0345967 A1 | 12/2015 | Meuleau |
| 2015/0370228 A1 | 12/2015 | Kohn et al. |
| 2015/0375748 A1 | 12/2015 | Nagase et al. |
| 2016/0068158 A1 | 3/2016 | Elwart et al. |
| 2016/0129907 A1 | 5/2016 | Kim et al. |
| 2016/0161270 A1 | 6/2016 | Okumura |
| 2016/0209842 A1 | 7/2016 | Thakur et al. |
| 2016/0209843 A1 | 7/2016 | Meuleau et al. |
| 2016/0209848 A1 | 7/2016 | Kojo et al. |
| 2016/0260328 A1 | 9/2016 | Mishra et al. |
| 2016/0318511 A1 | 11/2016 | Rangwala |
| 2016/0318515 A1 | 11/2016 | Laur et al. |
| 2016/0334230 A1 | 11/2016 | Ross et al. |
| 2016/0334797 A1 | 11/2016 | Ross et al. |
| 2016/0335892 A1 | 11/2016 | Okada et al. |
| 2016/0339919 A1 | 11/2016 | Habu et al. |
| 2016/0375766 A1 | 12/2016 | Konet et al. |
| 2016/0375768 A1 | 12/2016 | Konet et al. |
| 2017/0008168 A1 | 1/2017 | Weng et al. |
| 2017/0010108 A1 | 1/2017 | Shashua |
| 2017/0010617 A1 | 1/2017 | Shashua et al. |
| 2017/0031361 A1 | 2/2017 | Olson et al. |
| 2017/0032590 A1 | 2/2017 | Stefan et al. |
| 2017/0038777 A1 | 2/2017 | Harvey |
| 2017/0090478 A1 | 3/2017 | Blayvas et al. |
| 2017/0090480 A1 | 3/2017 | Ho et al. |
| 2017/0102700 A1 | 4/2017 | Kozak |
| 2017/0124476 A1 | 5/2017 | Levinson et al. |
| 2017/0137025 A1 | 5/2017 | Muto et al. |
| 2017/0158193 A1 | 6/2017 | Lopez et al. |
| 2017/0215045 A1 | 7/2017 | Rasal et al. |
| 2017/0225760 A1 | 8/2017 | Sidki et al. |
| 2017/0236422 A1 | 8/2017 | Naka et al. |
| 2017/0261325 A1 | 9/2017 | Schroeder et al. |
| 2017/0262790 A1 | 9/2017 | Khasis |
| 2017/0276780 A1 | 9/2017 | Takehara et al. |
| 2017/0277193 A1 | 9/2017 | Frazzoli et al. |
| 2017/0297576 A1 | 10/2017 | Halder et al. |
| 2017/0329338 A1 | 11/2017 | Wei et al. |
| 2017/0334451 A1 | 11/2017 | Asakura et al. |
| 2017/0356746 A1 | 12/2017 | Iagnemma |
| 2017/0357263 A1 | 12/2017 | Glatfelter et al. |
| 2017/0364831 A1* | 12/2017 | Ghosh ..................... G06F 40/40 |
| 2017/0369051 A1 | 12/2017 | Sakai et al. |
| 2017/0369062 A1 | 12/2017 | Saigusa et al. |
| 2017/0369067 A1 | 12/2017 | Saigusa et al. |
| 2017/0371338 A1 | 12/2017 | Kamata et al. |
| 2018/0004214 A1 | 1/2018 | Wisniowski et al. |
| 2018/0011494 A1 | 1/2018 | Zhu et al. |
| 2018/0029500 A1 | 2/2018 | Katanoda |
| 2018/0032079 A1 | 2/2018 | Nishi |
| 2018/0046191 A1 | 2/2018 | Keller et al. |
| 2018/0129206 A1 | 5/2018 | Harada et al. |
| 2018/0147988 A1 | 5/2018 | Lee et al. |
| 2018/0173230 A1 | 6/2018 | Goldman-Shenhar et al. |
| 2018/0232585 A1 | 8/2018 | Kim |
| 2018/0290657 A1 | 10/2018 | Ryne et al. |
| 2018/0341880 A1 | 11/2018 | Kislovskiy et al. |
| 2018/0342033 A1 | 11/2018 | Kislovskiy et al. |
| 2018/0348786 A1 | 12/2018 | Yasui et al. |
| 2018/0349785 A1 | 12/2018 | Zheng et al. |
| 2018/0373245 A1 | 12/2018 | Nishi |
| 2019/0011918 A1 | 1/2019 | Son et al. |
| 2019/0047564 A1 | 2/2019 | Brady et al. |
| 2019/0047584 A1 | 2/2019 | Donnelly |
| 2019/0086549 A1 | 3/2019 | Ushani et al. |

(56) References Cited

U.S. PATENT DOCUMENTS

| | | |
|---|---|---|
| 2019/0087307 A1 | 3/2019 | Zhan et al. |
| 2019/0096244 A1 | 3/2019 | Guruva Reddiar et al. |
| 2019/0101919 A1 | 4/2019 | Kabilarov et al. |
| 2019/0113918 A1 | 4/2019 | Englard et al. |
| 2019/0129436 A1 | 5/2019 | Sun et al. |
| 2019/0135281 A1 | 5/2019 | Miura et al. |
| 2019/0193722 A1 | 6/2019 | Yamamuro et al. |
| 2019/0196471 A1 | 6/2019 | Vaughn et al. |
| 2019/0202476 A1 | 7/2019 | Tao et al. |
| 2019/0258268 A1 | 8/2019 | MacNeille et al. |
| 2019/0295179 A1 | 9/2019 | Shalev-Shwartz et al. |
| 2019/0299991 A1 | 10/2019 | Horii et al. |
| 2019/0310632 A1* | 10/2019 | Nakhaei Sarvedani ............... G06V 20/58 |
| 2019/0310654 A1 | 10/2019 | Halder |
| 2019/0317506 A1 | 10/2019 | Ishioka |
| 2019/0329771 A1 | 10/2019 | Wray et al. |
| 2019/0329782 A1 | 10/2019 | Shalev-Shwartz et al. |
| 2019/0339088 A1 | 11/2019 | Jeswani et al. |
| 2019/0359209 A1 | 11/2019 | Mizutani et al. |
| 2020/0079377 A1 | 3/2020 | Yashiro et al. |
| 2020/0097008 A1 | 3/2020 | Sadat et al. |
| 2020/0180647 A1 | 6/2020 | Anthony |
| 2020/0269871 A1 | 8/2020 | Schmidt et al. |
| 2020/0269875 A1 | 8/2020 | Wray et al. |
| 2020/0279488 A1 | 9/2020 | Shibasaki |
| 2020/0293041 A1 | 9/2020 | Palanisamy |
| 2020/0356828 A1 | 11/2020 | Palanisamy et al. |
| 2020/0363814 A1 | 11/2020 | He et al. |
| 2020/0389469 A1 | 12/2020 | Litichever et al. |
| 2020/0406906 A1 | 12/2020 | Omari et al. |
| 2021/0024092 A1 | 1/2021 | Han et al. |
| 2021/0089048 A1 | 3/2021 | Tran |
| 2021/0116915 A1 | 4/2021 | Jiang et al. |
| 2021/0237759 A1 | 8/2021 | Wray et al. |
| 2021/0240190 A1 | 8/2021 | Wray et al. |
| 2021/0279331 A1 | 9/2021 | Gilad et al. |
| 2021/0294323 A1 | 9/2021 | Bentahar et al. |
| 2021/0374540 A1 | 12/2021 | Yuan et al. |

FOREIGN PATENT DOCUMENTS

| | | | |
|---|---|---|---|
| CN | 105620470 A | 6/2016 | |
| CN | 105635849 A | 6/2016 | |
| CN | 106103232 A | 11/2016 | |
| CN | 106184223 A | 12/2016 | |
| CN | 106428000 A * | 2/2017 | ........ B60W 30/0956 |
| CN | 107577227 A | 1/2018 | |
| DE | 10341753 A1 | 4/2005 | |
| DE | 102012005245 A1 | 9/2012 | |
| DE | 102012220134 A1 | 5/2014 | |
| DE | 102013212255 A1 | 12/2014 | |
| DE | 102015201272 A1 | 7/2016 | |
| DE | 102016203086 A1 | 8/2017 | |
| EP | 2084690 A2 | 8/2009 | |
| EP | 2902864 A1 | 8/2015 | |
| EP | 2958783 A1 | 12/2015 | |
| EP | 3273423 A1 | 1/2018 | |
| JP | H02-114304 A | 4/1990 | |
| JP | 2007179388 A | 7/2007 | |
| JP | 2012-221291 A | 11/2012 | |
| JP | 2015-140181 A | 8/2015 | |
| JP | 2015-199439 A | 11/2015 | |
| JP | 2015191273 A | 11/2015 | |
| JP | 2016017914 A | 2/2016 | |
| JP | 2016139163 A | 8/2016 | |
| JP | 201781426 A | 5/2017 | |
| JP | 2018-49445 A | 3/2018 | |
| RU | 2436167 C1 | 12/2011 | |
| WO | 2008/053373 A2 | 5/2008 | |
| WO | 2012-172632 A1 | 12/2012 | |
| WO | 2014/024336 A1 | 2/2014 | |
| WO | 2014/130178 A1 | 8/2014 | |
| WO | 2015/052865 A1 | 4/2015 | |
| WO | 2015112651 A1 | 7/2015 | |
| WO | 2015/134558 A1 | 9/2015 | |
| WO | 2016121572 A1 | 8/2016 | |
| WO | 2016124178 A1 | 8/2016 | |
| WO | 2016129067 A1 | 8/2016 | |
| WO | 2016130719 A2 | 8/2016 | |
| WO | 2017/013746 A1 | 1/2017 | |
| WO | 2017/013749 A1 | 1/2017 | |
| WO | 2017/022448 A1 | 2/2017 | |
| WO | 2017/120336 A2 | 7/2017 | |
| WO | 2018147871 A1 | 8/2018 | |
| WO | 2018147872 A1 | 8/2018 | |
| WO | 2018147873 A1 | 8/2018 | |
| WO | 2018147874 A1 | 8/2018 | |
| WO | 2020075961 A1 | 4/2020 | |

OTHER PUBLICATIONS

Brechtel et al.; Probabilistic decision-making under uncertainty for autonomous driving using continuous POMDPs; In: 2014 IEEE 17th International Conference on Intelligent Transportation Systems (ITSC); Oct. 11, 2014.

Santana et al.; Robust Coordination of Autonomous Systems through Risk-sensitive, Model-based Programming and Execution; Massachusetts Inst of Tech Cambridge Computer Science and Artificial Intelligence Lab; Oct. 9, 2015.

Kala et al.; Motion Planning of Autonomous Vehicles on a Dual Carriageway without Speed Lanes; Electronics; Jan. 13, 2015.

Matthews et al.; Intent Communication between Autonomous Vehicles and Pedestrians; 2015.

Ragi et al.; UAV path planning in a dynamic environment via partially observable Markov decision process; IEEE Transactions on Aerospace and Electronic Systems; Oct. 8, 2013.

Aoki, S. et al., A Merging Protocol for Self-Driving Vehicles, ICCPS, Apr. 2017.

International Application No. PCT/US2017/017493, filed Feb. 10, 2017.

International Application No. PCT/US2017/017502, filed Feb. 10, 2017.

International Application No. PCT/US2017/017516, filed Feb. 10, 2017.

International Application No. PCT/US2017/017527, filed Feb. 10, 2017.

U.S. Appl. No. 15/621,862, filed Jun. 13, 2017.

Chryssanthacopoulos et al., Decomposition Method for Optimized Collision Avoidance with Multiple Threats; DASC 2011, 30th IEEE/AIAA Digital Avionics Systems Conference, Oct. 16-20, 2011, 21 pages; https://ieeexplore.ieee.org/document/6095973.

Wray et al., Online Decision-Making for Scalable Autonomous Systems; Conference: Twenty-Sixth International Joint Conference on Artificial Intelligence; Conference Paper ■ Aug. 2017 ; 7 pages https://www.researchgate.net/publication/318830226_Online_Decision-Making_for_Scalable_Autonomous_Systems.

Wray et al., Online Decision-Making for Scalable Autonomous Systems; Power Point Presentation; Aug. 23, 2017.

Miller, Tim, Explanation in Artificial Intelligence: Insights from the Social Sciences; Aug. 15, 2018; 66 pages; arXiv:1706.07269v3 ; https://arxiv.org/abs/1706.07269.

Bouton et al., Scalable Decision Making with Sensor Occlusions for Autonomous Driving; 2018 IEEE International Conference on Robotics and Automation (ICRA), Brisbane, Australia, May 21-25, 2018; 6 pages.

Brechtel et al., Probabilistic Decision-Making Under Uncertainty for Autonomous Driving Using Continuous POMPDs, 2014 IEEE 17th International Conference on Intelligent Transportation Systems, Oct. 8-11, 2014; pp. 392-399.

Bai et al., Intention-Aware Online POMPD Planning for Autonomous Driving in a Crowd; 2015 IEEE International Conference on Robotics and Automation; Washington State Convention Center, Seattle, Washington; May 26-30, 2015; pp. 454-460.

Extended European Search Report of corresponding application EP 17895657.9; dated Feb. 25, 2020; 9 pages.

(56) References Cited

OTHER PUBLICATIONS

Dai, P., Mausam, & Weld, D. (2021). Focused Topological Value Iteration. Proceedings of the International Conference on Automated Planning and Scheduling, 19(1), 82-89. https://doi.org/10.1609/icaps.v19i1.18138.

* cited by examiner

APPARATUS AND METHOD FOR POST-PROCESSING A DECISION-MAKING MODEL OF AN AUTONOMOUS VEHICLE USING MULTIVARIATE DATA

TECHNICAL FIELD

This disclosure relates generally to autonomous vehicle operational management and autonomous driving, and more particularly to decision-making of an autonomous vehicle.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. Traversing the portion of the vehicle transportation network may include performing an action of autonomous driving in response to the captured data. The action may be selected using artificial intelligence (e.g., trained machine-learning models) or other decision-making models.

SUMMARY

Disclosed herein are aspects, features, elements, implementations, and embodiments of tools for post-processing a decision-making model of an autonomous vehicle (AV) using multivariate data. The post-processing may define how inputs into a model for AV behavior affect outputs so as to modify the model. The model may be a Partially Observable Markov Decision Process (POMDP) model in some examples.

An aspect of the disclosed embodiments is an apparatus for post-processing of a decision-making model of an AV. The apparatus includes a processor. The processor is configured to receive a decision-making model comprising a plurality of states, wherein the decision-making model is processed using multivariate data, and the multivariate data comprises values for at least three observations of a vehicle operational scenario. The processor is also configured to generate a slice of a decision space of the decision-making model by fixing values of all except two observations of the at least three observations, and modifying the values of the two observations to obtain multiple alternative solutions for the decision-making model, wherein the multiple alternative solutions and the modified values form the slice of the decision space, and each of the multiple alternative solutions is associated with a respective first value of a first observation of the two observations and a respective second value of a second observation of the two observations. The processor is configured to generate a solution to a modified decision-making model, the modified decision-making model comprising the decision-making model modified by, for at least one state and at least one of the two observations, modifying at least one of a probabilistic transition matrix or a probabilistic observation matrix of the decision-making model.

In another apparatus for post-processing of a decision-making model of an AV, a processor is configured to receive a decision-making model comprising a plurality of states, wherein the decision-making model is processed using multivariate data, and the multivariate data comprises values for at least three observations of a vehicle operational scenario. The processor is also configured to, for each unique pair of the at least three observations, generate a slice of a decision space of the decision-making model. To generate the slice comprises to fix values of all of the at least three observations except for the unique pair, and modify the values of the unique pair to obtain multiple alternative solutions for the decision-making model, wherein the multiple alternative solutions and the modified values form the slice of the decision space, and each of the multiple alternative solutions is associated with a respective first value of a first observation of the unique pair and a respective second value of a second observation of the unique pair. The processor is configured to generate a solution to a modified decision-making model, the modified decision-making model comprising the decision-making model modified by, for a state and an observation of the at least three observations, modifying at least one of a probabilistic transition matrix or a probabilistic observation matrix of the decision-making model Another aspect of the disclosed embodiments is a method for post-processing of a decision-making model of an AV. The method includes receiving a decision-making model comprising a plurality of states, wherein the decision-making model is processed using multivariate data, and the multivariate data comprises values for at least three observations of a vehicle operational scenario, generating a slice of a decision space of the decision-making model, which includes fixing values of all except a first observation and a second observation of the at least three observations and modifying the values of the first observation and the second observation to obtain multiple alternative solutions for the decision-making model, wherein the multiple alternative solutions and the modified values form the slice of the decision space, and each of the multiple alternative solutions is associated with a respective first value of the first observation and a respective second value of the second observation, and generating a solution to a modified decision-making model, the modified decision-making model comprising the decision-making model modified by, for at least one state and at least one of the two observations, modifying at least one of a probabilistic transition matrix or a probabilistic observation matrix of the decision-making model Variations in these and other aspects, features, elements, implementations, and embodiments of the methods, apparatus, procedures, and algorithms disclosed herein are described in further detail hereafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various aspects of the methods and apparatuses disclosed herein will become more apparent by referring to the examples provided in the following description and drawings in which like reference numbers refer to like elements.

FIG. 6A is a graph representing the optimal solution for varying values of two observations, and FIG. 6B is a graph representing the value to the next best solution for the two observations.

FIG. 7A is a graph representing the optimal solution for varying values of two observations, and FIG. 7B is a graph representing the value to the next best solution for the two observations.

DETAILED DESCRIPTION

A vehicle, such as an autonomous vehicle (AV), or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof. As used herein, an AV encompasses a semi-autonomous vehicle, or any other vehicle capable of operating responsive to a remote instruction as discussed below.

During autonomous driving, and at different time steps (e.g., at every time step), some component (e.g., a decision-making module or model such as a reasoning module, an inference module, or the like) of the AV may determine a respective action for controlling the AV in response to sensor information. Thus, at a high level, the component of the AV uses inputs (e.g., sensor data) and produces an output (e.g., the action to control the AV) where the output can be an action for controlling the AV.

The component can be a single component (e.g., module, model, circuitry, etc.), multiple cooperating components, or a command arbitration module (e.g., an executor or an autonomous vehicle operational management controller) that receives inputs (e.g., candidate actions) from multiple components and selects one of the candidate actions as the selected action for controlling the AV.

Decision making in such circumstances can be very opaque process for several reasons, including without limitation the number of parameters used in the process, and their differing effects into a solution. The present disclosure manipulates inputs into a decision-making model so as to further process the decision-making model. Details are described in detail below starting with a description of an AV with which the invention may be used.

Figure 1:
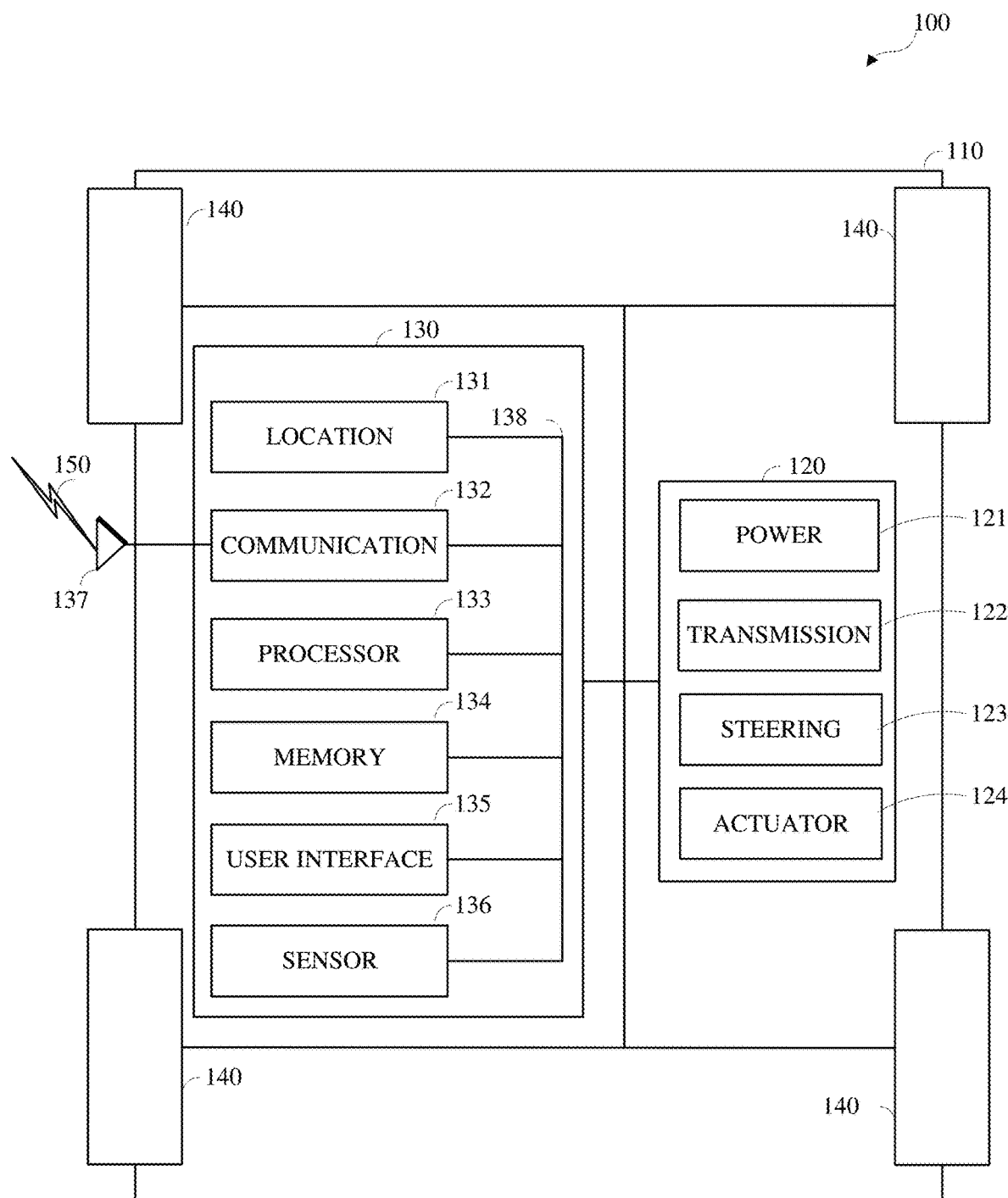
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. As shown, a vehicle 100 includes a chassis 110, a powertrain 120, a controller 130, and wheels 140. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

As shown, the powertrain 120 includes a power source 121, a transmission 122, a steering unit 123, and an actuator 124. Other elements or combinations of elements of a powertrain, such as a suspension, a drive shaft, axles, or an exhaust system may be included. Although shown separately, the wheels 140 may be included in the powertrain 120.

The power source 121 may include an engine, a battery, or a combination thereof. The power source 121 may be any device or combination of devices operative to provide energy, such as electrical energy, thermal energy, or kinetic energy. For example, the power source 121 may include an engine, such as an internal combustion engine, an electric motor, or a combination of an internal combustion engine and an electric motor, and may be operative to provide kinetic energy as a motive force to one or more of the wheels 140. The power source 121 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 may receive energy, such as kinetic energy, from the power source 121, and may transmit the energy to the wheels 140 to provide a motive force. The transmission 122 may be controlled by the controller 130 the actuator 124 or both. The steering unit 123 may be controlled by the controller 130 the actuator 124 or both and may control the wheels 140 to steer the vehicle. The actuator 124 may receive signals from the controller 130 and may actuate or control the power source 121, the transmission 122, the steering unit 123, or any combination thereof to operate the vehicle 100.

As shown, the controller 130 may include a location unit 131, an electronic communication unit 132, a processor 133, a memory 134, a user interface 135, a sensor 136, an electronic communication interface 137, or any combination thereof. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the electronic communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 may be operatively coupled with the location unit 131, the memory 134, the electronic communication interface 137, the electronic communication unit 132, the user interface 135, the sensor 136, the powertrain 120, or any combination thereof. For example, the processor may be operatively coupled with the memory 134 via a communication bus 138.

The memory 134 may include any tangible non-transitory computer-usable or computer-readable medium, capable of, for example, containing, storing, communicating, or transporting machine readable instructions, or any information associated therewith, for use by or in connection with the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The communication unit 132 may be configured to transmit or receive signals via a wired or wireless electronic communication medium 150, such as via the communication interface 137. Although not explicitly shown in FIG. 1, the communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single communication unit 132 and a single communication interface 137, any number of communication units and any number of communication interfaces may be used. In some embodiments, the communication unit 132 may include a dedicated short-range communications (DSRC) unit, an on-board unit (OBU), or a combination thereof.

The location unit 131 may determine geolocation information, such as longitude, latitude, elevation, direction of travel, or speed, of the vehicle 100. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include an audio interface for performing audio communication with a person and a touch display for performing visual and touch-based communication with the person. The user interface 135 may include multiple displays, such as multiple physically separate units, multiple defined portions within a single physical unit, or a combination thereof.

The sensor 136 may include one or more sensors, such as an array of sensors, which may be operable to provide information that may be used to control the vehicle. The sensors 136 may provide information regarding current operating characteristics of the vehicle 100. The sensor 136 can include, for example, a speed sensor, acceleration sensors, a steering angle sensor, traction-related sensors, braking-related sensors, steering wheel position sensors, eye tracking sensors, seating position sensors, or any sensor, or combination of sensors, operable to report information regarding some aspect of the current dynamic situation of the vehicle 100.

The sensor 136 may include one or more sensors operable to obtain information regarding the physical environment surrounding the vehicle 100. For example, one or more sensors may detect road geometry and features, such as lane lines, and obstacles, such as fixed obstacles, vehicles, and pedestrians. The sensor 136 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 136 and the location unit 131 may be a combined unit.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel, which may be pivoted to a steering angle under control of the steering unit 123, a propelled wheel, which may be torqued to propel the vehicle 100 under control of the transmission 122, or a steered and propelled wheel that may steer and propel the vehicle 100.

A vehicle may include units, or elements, not expressly shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle controlled autonomously, without direct human intervention, to traverse a portion of a vehicle transportation network. Although not shown separately in FIG. 1, an autonomous vehicle may include an autonomous vehicle control unit, which may perform autonomous vehicle routing, navigation, and control. The autonomous vehicle control unit may be integrated with another unit of the vehicle. For example, the controller 130 may include the autonomous vehicle control unit. The teachings herein are equally applicable to a semi-autonomous vehicle.

The autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network data representing the vehicle transportation network, or a combination thereof, and may control or operate the vehicle 100 to traverse the vehicle transportation network in accordance with the route. For example, the autonomous vehicle control unit may output the route of travel to the trajectory controller, and the trajectory controller may operate the vehicle 100 to travel from the origin to the destination using the generated route.

Figure 2:
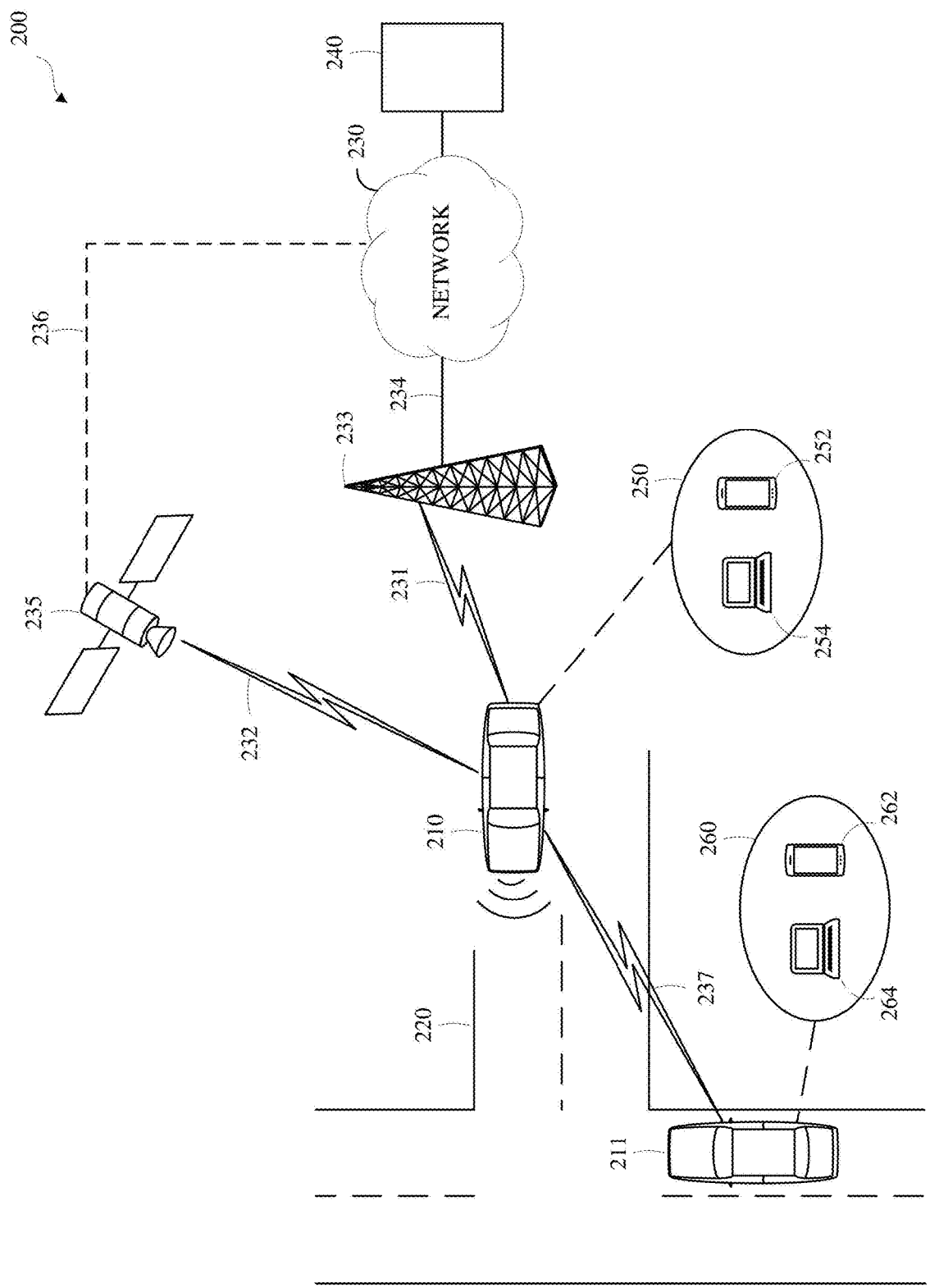
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which may travel via one or more portions of one or more vehicle transportation networks 220, and may communicate via one or more electronic communication networks 230. Although not explicitly shown in FIG. 2, a vehicle may traverse an area that is not expressly or completely included in a vehicle transportation network, such as an off-road area.

The electronic communication network 230 may be, for example, a multiple access system and may provide for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the network 230.

In some embodiments, a vehicle 210/211 may communicate via a wired communication link (not shown), a wireless communication link 231/232/237, or a combination of any number of wired or wireless communication links. For example, as shown, a vehicle 210/211 may communicate via a terrestrial wireless communication link 231, via a non-terrestrial wireless communication link 232, or via a combination thereof. The terrestrial wireless communication link 231 may include an Ethernet link, a serial link, a Bluetooth® link, an infrared (IR) link, a UV link, or any link capable of providing for electronic communication.

A vehicle 210/211 may communicate with another vehicle 210/2110. For example, a host, or subject, vehicle (HV) 210 may receive one or more automated inter-vehicle messages, such as a basic safety message (BSM), from a remote, or target, vehicle (RV) 211, via a direct communication link 237, or via a network 230. For example, the remote vehicle 211 may broadcast the message to host vehicles within a defined broadcast range, such as 300 meters. In some embodiments, the host vehicle 210 may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the communications network 230 via an access point 233. The access point 233, which may include a computing device, may be configured to communicate with a vehicle 210, with a communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit in FIG. 2, an access point may include any number of interconnected elements.

The vehicle 210 may communicate with the communications network 230 via a satellite 235 or other non-terrestrial communication device. The satellite 235, which may include a computing device, may be configured to communicate with a vehicle 210, with a communication network 230, with one or more communication devices 240, or with a combination thereof via one or more communication links 232/236. Although shown as a single unit in FIG. 2, a satellite may include any number of interconnected elements.

An electronic communication network 230 may be any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 may use a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit in FIG. 2, an electronic communication network may include any number of interconnected elements.

The vehicle 210 may identify a portion or condition of the vehicle transportation network 220. For example, the vehicle 210 may include one or more on-vehicle sensors, such as sensor 136 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220. The sensor data may include lane line data, remote vehicle location data, or both.

The vehicle 210 may traverse a portion or portions of one or more vehicle transportation networks 220 using information communicated via the network 230, such as information representing the vehicle transportation network 220, information identified by one or more on-vehicle sensors, or a combination thereof.

Although for simplicity FIG. 2 shows two vehicles 210, 211, one vehicle transportation network 220, one electronic communication network 230, and one communication device 240, any number of vehicles, networks, or computing devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the network 230, the vehicle 210 may communicate with the communication device 240 via any number of direct or indirect communication links. For example, the vehicle 210 may communicate with the communication device 240 via a direct communication link, such as a Bluetooth communication link.

In some embodiments, a vehicle 210/211 may be associated with an entity 250/260, such as a driver, operator, or owner of the vehicle. In some embodiments, an entity 250/260 associated with a vehicle 210/211 may be associated with one or more personal electronic devices 252/254/262/264, such as a smartphone 252/262 or a computer 254/264. In some embodiments, a personal electronic device 252/254/262/264 may communicate with a corresponding vehicle 210/211 via a direct or indirect communication link. Although one entity 250/260 is shown as associated with a respective vehicle 210/211 in FIG. 2, any number of vehicles may be associated with an entity and any number of entities may be associated with a vehicle.

The vehicle transportation network 220 shows only navigable areas (e.g., roads), but the vehicle transportation network may also include one or more unnavigable areas, such as a building, one or more partially navigable areas, such as a parking area or pedestrian walkway, or a combination thereof. The vehicle transportation network 220 may also include one or more interchanges between one or more navigable, or partially navigable, areas. A portion of the vehicle transportation network 220, such as a road, may include one or more lanes and may be associated with one or more directions of travel.

A vehicle transportation network, or a portion thereof, may be represented as vehicle transportation network data. For example, vehicle transportation network data may be expressed as a hierarchy of elements, such as markup language elements, which may be stored in a database or file. For simplicity, the figures herein depict vehicle transportation network data representing portions of a vehicle transportation network as diagrams or maps; however, vehicle transportation network data may be expressed in any computer-usable form capable of representing a vehicle transportation network, or a portion thereof. The vehicle transportation network data may include vehicle transportation network control information, such as direction of travel information, speed limit information, toll information, grade information, such as inclination or angle information, surface material information, aesthetic information, defined hazard information, or a combination thereof.

A portion, or a combination of portions, of the vehicle transportation network 220 may be identified as a point of interest or a destination. For example, the vehicle transportation network data may identify a building as a point of interest or destination. The point of interest or destination may be identified using a discrete uniquely identifiable geolocation. For example, the vehicle transportation network 220 may include a defined location, such as a street address, a postal address, a vehicle transportation network address, a GPS address, or a combination thereof for the destination.

Figure 3:
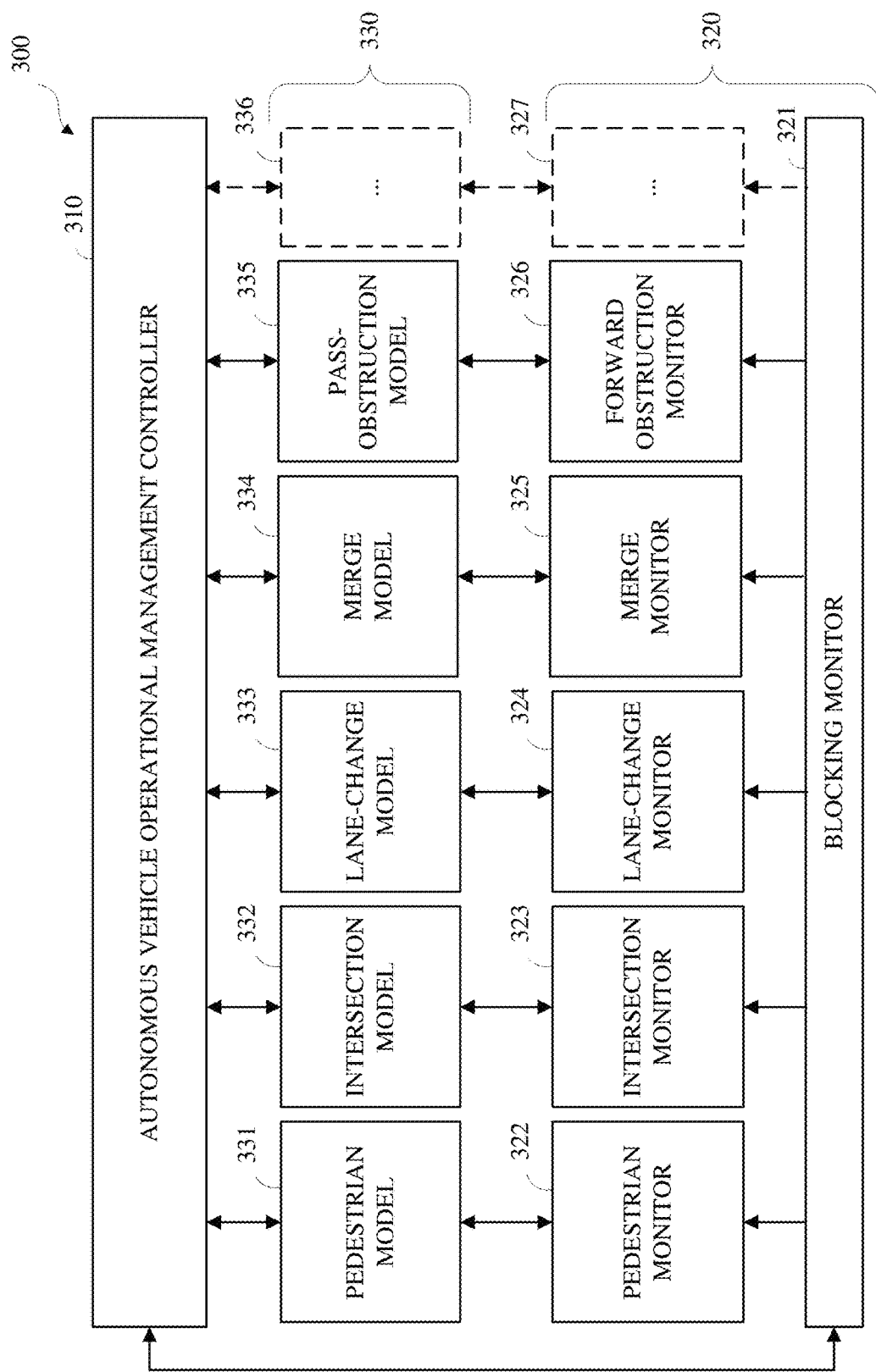
FIG. 3 is a diagram of an example of an autonomous vehicle operational management system in accordance with embodiments of this disclosure.

FIG. 3 is a diagram of an example of an autonomous vehicle operational management system 300 in accordance with embodiments of this disclosure. The autonomous vehicle operational management system 300 may be implemented in an autonomous vehicle, such as the vehicle 100 shown in FIG. 1, one of the vehicles 210/211 shown in FIG. 2, a semi-autonomous vehicle, or any other vehicle implementing autonomous driving.

The autonomous vehicle may traverse a vehicle transportation network, or a portion thereof, which may include traversing distinct vehicle operational scenarios. A distinct vehicle operational scenario may include any distinctly identifiable set of operative conditions that may affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

For simplicity and clarity, similar vehicle operational scenarios may be described herein with reference to vehicle operational scenario types or classes. A type or class of a vehicle operation scenario may refer to a defined pattern or a defined set of patterns of the scenario. For example, intersection scenarios may include the autonomous vehicle traversing an intersection, pedestrian scenarios may include the autonomous vehicle traversing a portion of the vehicle transportation network that includes, or is within a defined proximity of, one or more pedestrians, such as wherein a pedestrian is crossing, or approaching, the expected path of the autonomous vehicle; lane-change scenarios may include the autonomous vehicle traversing a portion of the vehicle transportation network by changing lanes; merge scenarios may include the autonomous vehicle traversing a portion of the vehicle transportation network by merging from a first lane to a merged lane; pass-obstruction scenarios may include the autonomous vehicle traversing a portion of the vehicle transportation network by passing an obstacle or obstruction. Although pedestrian vehicle operational scenarios, intersection vehicle operational scenarios, lane-change vehicle operational scenarios, merge vehicle operational scenarios, and pass-obstruction vehicle operational scenarios are described herein, any other vehicle operational scenario or vehicle operational scenario type may be used.

As shown in FIG. 3, the autonomous vehicle operational management system 300 includes an autonomous vehicle operational management controller (AVOMC) 310, operational environment monitors 320, and operation control evaluation modules (also referred to as models) 330.

The AVOMC 310 may receive, identify, or otherwise access, operational environment data representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle, within a defined spatiotemporal area of an identified route for the autonomous vehicle, or a combination thereof. For example, operative conditions that may affect the operation of the autonomous vehicle may be identified based on sensor data, vehicle transportation network data, route data, or any other data or combination of data representing a defined or determined operational environment for the vehicle.

The operational environment data may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. The operational environment data may include information representing the vehicle transportation network proximate to the autonomous vehicle, an identified route for the autonomous vehicle, or both. For example, this may include information within a defined spatial distance, such as 300 meters, of portions of the vehicle transportation network along the identified route, information indicating the geometry of one or more aspects of the vehicle transportation network, information indicating a condition, such as a surface condition, of the vehicle transportation network, or any combination thereof.

The operational environment data may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

The autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 300 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

The AVOMC 310 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the AVOMC 310 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both. Monitoring the operational environment of the autonomous vehicle may include using operational environment data received from the operational environment monitors 320.

The operational environment monitors 320 may include scenario-agnostic monitors, scenario-specific monitors, or a combination thereof. A scenario-agnostic monitor, such as a blocking monitor 321, may monitor the operational environment of the autonomous vehicle, generate operational environment data representing aspects of the operational environment of the autonomous vehicle, and output the operational environment data to one or more scenario-specific monitor, the AVOMC 310, or a combination thereof, as discussed in further detail below. A scenario-specific monitor, such as a pedestrian monitor 322, an intersection monitor 323, a lane-change monitor 324, a merge monitor 325, or a forward obstruction monitor 326, may monitor the operational environment of the autonomous vehicle, generate operational environment data representing scenario-specific aspects of the operational environment of the autonomous vehicle, and output the operational environment data to one or more operation control evaluation models 330, the AVOMC 310, or a combination thereof.

For example, the pedestrian monitor 322 may be an operational environment monitor for monitoring pedestrians, the intersection monitor 323 may be an operational environment monitor for monitoring intersections, the lane-change monitor 324 may be an operational environment monitor for monitoring lane-changes, the merge monitor 325 may be an operational environment monitor for merges, and the forward obstruction monitor 326 may be an operational environment monitor for monitoring forward obstructions. An operational environment monitor 327 is shown using broken lines to indicate that the autonomous vehicle operational management system 300 may include any number of operational environment monitors 320.

An operational environment monitor 320 may receive, or otherwise access, operational environment data, such as operational environment data generated or captured by one or more sensors of the autonomous vehicle, vehicle transportation network data, vehicle transportation network geometry data, route data, or a combination thereof. For example, the pedestrian monitor 322 may receive, or otherwise access, information, such as sensor data, which may indicate, correspond to, or may otherwise be associated with, one or more pedestrians in the operational environment of the autonomous vehicle. An operational environment monitor 320 may associate the operational environment data, or a portion thereof, with the operational environment, or an aspect thereof, such as with an external object, such as a pedestrian, a remote vehicle, or an aspect of the vehicle transportation network geometry.

An operational environment monitor 320 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment data. An operational environment monitor 320 may output the information representing the one or more aspects of the operational environment to, or for access by, the AVOMC 310, such by storing the information representing the one or more aspects of the operational environment in a memory, such as the memory 134 shown in FIG. 1, of the autonomous vehicle accessible by the AVOMC 310, sending the information representing the one or more aspects of the operational environment to the AVOMC 310, or a combination thereof. An operational environment monitor 320 may output the operational environment data to one or more elements of the autonomous vehicle operational management system 300, such as the AVOMC 310. Although not shown in FIG. 3, a scenario-specific operational environment monitor 322, 323, 324, 325, 326 may output operational environment data to a scenario-agnostic operational environment monitor, such as the blocking monitor 321.

The pedestrian monitor 322 may correlate, associate, or otherwise process the operational environment data to identify, track, or predict actions of one or more pedestrians. For example, the pedestrian monitor 322 may receive information, such as sensor data, from one or more sensors, which may correspond to one or more pedestrians, the pedestrian monitor 322 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian monitor 322 may output the identified, associated, or generated pedestrian information to, or for access by, the AVOMC 310.

The intersection monitor 323 may correlate, associate, or otherwise process the operational environment data to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection monitor 323 may receive information, such as sensor data, from one or more sensors, which may correspond to one or more remote vehicles in the operational environment of the autonomous vehicle, the intersection, or one or more aspects thereof, in the operational environment of the autonomous vehicle, the vehicle transportation network geometry, or a combination thereof, the intersection monitor 323 may associate the sensor data with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles. The intersection monitor 323 may output the identified, associated, or generated intersection information to, or for access by, the AVOMC 310.

The lane-change monitor 324 may correlate, associate, or otherwise process the operational environment data to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a lane-change operation. For example, the lane-change monitor 324 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a lane-change operation, the lane-change monitor 324 may associate the sensor data with one or more identified remote vehicles in the operational environment of the autonomous vehicle, one or more aspects of the operational environment of the autonomous vehicle or a combination thereof geospatially corresponding to a lane-change operation, which may include may identifying a current or expected direction of travel, a path, such as an expected path, a current or expected velocity, a current or expected acceleration rate, or a combination thereof for one or more of the respective identified remote vehicles. The lane-change monitor 324 may output the identified, associated, or generated lane-change information to, or for access by, the AVOMC 310

The merge monitor 325 may correlate, associate, or otherwise process the operational environment information to identify, track, or predict actions of one or more remote vehicles in the operational environment of the autonomous vehicle, to identify one or more aspects of the operational environment of the autonomous vehicle, such as vehicle transportation network geometry in the operational environment of the autonomous vehicle, or a combination thereof geospatially corresponding to a merge operation. For example, the merge monitor 325 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a merge operation, the merge monitor 325 may associate the sensor data with one or more identified remote vehicles in the operational environment of the autonomous vehicle, one or more aspects of the operational environment of the autonomous vehicle or a combination thereof geospatially corresponding to a merge operation, which may include identifying a current or expected direction of travel, a path, such as an expected path, a current or expected velocity, a current or expected acceleration rate, or a combination thereof for one or more of the respective identified remote vehicles. The merge monitor 325 may output the identified, associated, or generated merge information to, or for access by, the AVOMC 310.

The forward obstruction monitor 326 may correlate, associate, or otherwise process the operational environment information to identify one or more aspects of the operational environment of the autonomous vehicle geospatially corresponding to a forward pass-obstruction operation. For example, the forward obstruction monitor 326 may identify vehicle transportation network geometry in the operational environment of the autonomous vehicle. The forward obstruction monitor 326 may identify one or more obstructions or obstacles in the operational environment of the autonomous vehicle, such as a slow or stationary remote vehicle along the expected path of the autonomous vehicle or along an identified route for the autonomous vehicle; and the forward obstruction monitor 326 may identify, track, or predict actions of one or more remote vehicles in the operational environment of the autonomous vehicle. The forward obstruction monitor 326 may receive information, such as sensor data, from one or more sensors, which may correspond to one or more remote vehicles in the operational environment of the autonomous vehicle, one or more aspects of the operational environment of the autonomous vehicle in the operational environment of the autonomous vehicle or a combination thereof geospatially corresponding to a forward pass-obstruction operation. The forward obstruction monitor 326 may associate the sensor data with one or more identified remote vehicles in the operational environment of the autonomous vehicle, one or more aspects of the operational environment of the autonomous vehicle or a combination thereof geospatially corresponding to the forward pass-obstruction operation, which may include may identifying a current or expected direction of travel, a path, such as an expected path, a current or expected velocity, a current or expected acceleration rate, or a combination thereof for one or more of the respective identified remote vehicles. The forward obstruction monitor 326 may output the identified, associated, or generated forward obstruction information to, or for access by, the AVOMC 310.

While shown as an operation environment monitor 320, the blocking monitor 321 may be a separate monitoring device. The blocking monitor 321 may receive operational environment data representing an operational environment, or an aspect thereof, for the autonomous vehicle. For example, the blocking monitor 321 may receive the operational environment information from the AVOMC 310, from a sensor of the vehicle, from an external device, such as a remote vehicle or an infrastructure device, or a combination thereof. The blocking monitor 321 may read the operational environment information, or a portion thereof, from a memory, such as a memory of the autonomous vehicle, such as the memory 134 shown in FIG. 1.

The blocking monitor 321, using this input, may determine a respective probability of availability (POA), or corresponding blocking probability, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle. A probability of availability, or corresponding blocking probability, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 321 may identify a respective probability of availability for each of multiple portions of the vehicle transportation network within an operational environment, such as within 300 meters, of the autonomous vehicle. The blocking monitor 321 may determine, or update, probabilities of availability continually or periodically. The blocking monitor 321 may communicate probabilities of availability, or corresponding blocking probabilities, to the AVOMC 310.

A probability of availability may be indicated by the blocking monitor 321 corresponding to each external object in the operational environment of the autonomous vehicle and a geospatial area may be associated with multiple probabilities of availability corresponding to multiple external objects. An aggregate probability of availability may be indicated by the blocking monitor 321 corresponding to each type of external object in the operational environment of the autonomous vehicle, such as a probability of availability for pedestrians and a probability of availability for remote vehicles, and a geo spatial area may be associated with multiple probabilities of availability corresponding to multiple external object types.

The blocking monitor 321 may identify external objects, track external objects, project location information, path information, or both for external objects, or a combination thereof. For example, the blocking monitor 321 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 321 may communicate probabilities of availability, or corresponding blocking probabilities, to the AVOMC 310. The AVOMC 310 may communicate the probabilities of availability, or corresponding blocking probabilities, to respective instantiated instances of the operational control evaluation modules 330.

The AVOMC 310 may identify one or more distinct vehicle operational scenarios based on one or more aspects of the operational environment represented by the operational environment data. For example, the AVOMC 310 may identify a distinct vehicle operational scenario in response to identifying, or based on, the operational environment data indicated by one or more of the operational environment monitors 320. The distinct vehicle operational scenario may be identified based on route data, sensor data, or a combination thereof. For example, the AVOMC 310 may identify one or multiple distinct vehicle operational scenarios corresponding to an identified route for the vehicle, such as based on map data corresponding to the identified route, in response to identifying the route. Multiple distinct vehicle operational scenarios may be identified based on one or more aspects of the operational environment represented by the operational environment data. For example, the operational environment data may include information representing a pedestrian approaching an intersection along an expected path for the autonomous vehicle, and the AVOMC 310 may identify a pedestrian vehicle operational scenario, an intersection vehicle operational scenario, or both.

The AVOMC 310 may instantiate respective instances of one or more of the operation control evaluation models 330 based on one or more aspects of the operational environment represented by the operational environment data, such as the identification of an upcoming scenario. An upcoming scenario may be a distinct vehicle operational scenario that the AVOMC 310 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

The operation control evaluation models 330 may include scenario-specific operation control evaluation model (SSOCEMs), such as a pedestrian-SSOCEM 331, an intersection-SSOCEM 332, a lane-change-SSOCEM 333, a merge-SSOCEM 334, a pass-obstruction-SSOCEM 335, or a combination thereof. A SSOCEM 336 is shown using broken lines to indicate that the autonomous vehicle operational management system 300 may include any number of SSOCEMs 330. For example, the AVOMC 310 may instantiate an instance of a SSOCEM 330 in response to identifying a distinct vehicle operational scenario. The AVOMC 310 may instantiate multiple instances of one or more SSOCEMs 330 based on one or more aspects of the operational environment represented by the operational environment data. For example, the operational environment data may indicate two pedestrians in the operational environment of the autonomous vehicle and the AVOMC 310 may instantiate a respective instance of the pedestrian-SSOCEM 331 for each pedestrian.

The AVOMC 310 may send the operational environment data, or one or more aspects thereof, to another unit of the autonomous vehicle, such as the blocking monitor 321 or one or more instances of the SSOCEMs 330. For example, the AVOMC 310 may communicate the probabilities of availability, or corresponding blocking probabilities, received from the blocking monitor 321 to respective instantiated instances of the SSOCEMs 330. The AVOMC 310 may store the operational environment data, or one or more aspects thereof, such as in a memory, such as the memory 134 shown in FIG. 1, of the autonomous vehicle.

Although not expressly shown in FIG. 3, the autonomous vehicle operational management system 300 may include a predictor module that may generate and send prediction information to the blocking monitor 321, and the blocking monitor 321 may output probability of availability information to one or more of the other operational environment monitors 320.

A SSOCEM 330, once instantiated, can receive the operational environment information, including sensor data, to determine and output a candidate vehicle control action, also called a candidate action herein. A candidate action is a vehicle control action that is identified by the particular SSOCEM 330 as the likely optimal action for the vehicle to perform that will handle a particular scenario. For instance, a SSOCEM 330 configured to handle intersections (e.g., an intersection SSOCEM 332) may output a "proceed", a candidate action that suggests proceeding through an intersection. At the same time, a SSOCEM 330 for handling lane changes (e.g., the lane change SSOCEM 333) may output a "turn left" candidate action indicating that the vehicle should merge left by two degrees. In some implementations, each SSOCEM 330 outputs a confidence score indicating a degree of confidence in the candidate action determined by the SSOCEM 330. For instance, a confidence score greater than 0.95 may indicate a very high confidence in the candidate action, while a confidence score less than 0.5 may indicate a relatively low degree of confidence in the candidate action. Further details of a SSOCEM 330 are described below.

The AVOMC 310 may receive one or more candidate actions from respective instances of the SSOCEMs 330. The AVOMC 310 may identify a vehicle control action from the candidate vehicle control actions, and may control the vehicle, or may provide the identified vehicle control action to another vehicle control unit, to traverse the vehicle transportation network in accordance with the vehicle control action.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network. For example, an 'advance' vehicle control action may include slowly inching forward a short distance, such as a few inches or a foot; an 'accelerate' vehicle control action may include accelerating a defined acceleration rate, or at an acceleration rate within a defined range; a 'decelerate' vehicle control action may include decelerating a defined deceleration rate, or at a deceleration rate within a defined range; a 'maintain' vehicle control action may include maintaining current operational parameters, such as by maintaining a current velocity, a current path or route, or a current lane orientation; and a 'proceed' vehicle control action may include beginning or resuming a previously identified set of operational parameters. Although some vehicle control actions are described herein, other vehicle control actions may be used.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In some implementations, the AVOMC 310 utilizes hardcoded logic to determine the vehicle control action from the candidate actions. For example, the AVOMC 310 may select the candidate action having the highest confidence score. In other implementations, the AVOMC 310 may select the candidate action that is the least likely to result in a collision. In other implementations, the AVOMC 310 may generate a compound action based on two or more non-conflicting candidate actions (e.g., compounding 'proceed' and 'turn left by two degrees' to result in a vehicle control action that causes the vehicle to veer left and proceed through an intersection). In some implementations, the AVOMC 310 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a POMDP, which may describe how respective candidate actions affect subsequent candidate actions, and may include a reward function that outputs a positive or negative reward for respective vehicle control actions.

The AVOMC 310 may uninstantiate an instance of a SSOCEM 330. For example, the AVOMC 310 may identify a distinct set of operative conditions as indicating a distinct vehicle operational scenario for the autonomous vehicle, instantiate an instance of a SSOCEM 330 for the distinct vehicle operational scenario, monitor the operative conditions, subsequently determine that one or more of the operative conditions has expired, or has a probability of affecting the operation of the autonomous vehicle below a defined threshold, and the AVOMC 310 may uninstantiate the instance of the SSOCEM 330.

As referred to briefly above, a SSOCEM 330 may model a respective distinct vehicle operational scenario. The autonomous vehicle operational management system 300 includes any number of SSOCEMs 330, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 330 may include one or more models that are configured to determine one or more vehicle control actions for handling a scenario given a set of inputs. The models may include, but are not limited to, POMDP models, MDP models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 330 includes computer-executable instructions that define a manner by which the models operate and a manner by which the models are utilized.

A SSOCEM 330 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 330 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

For example, a POMDP model may include an autonomous vehicle at a first geospatial location and a first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

A SSOCEM 330 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 330 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 330 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 300 may include any number or combination of types of models. For example, the pedestrian-SSOCEM 331, the intersection-SSOCEM 332, the lane-change-SSOCEM 333, the merge-SSOCEM 334, and the pass-obstruction-SSOCEM 335 may be POMDP models. In another example, the pedestrian-SSOCEM 331 may be an MDP model and the intersection-SSOCEM 332 may be a POMDP model. The AVOMC 310 may instantiate any number of instances of the SSOCEMs 330 based on the operational environment data. A module 336 is shown using broken lines to indicate that the autonomous vehicle operational management system 300 may include any number or additional types of SSOCEMs 330.

One or more of the AVOMC 310, the operational environment monitors 320, or the SSOCEMs 330 may operate continuously or periodically, such as at a frequency of ten hertz (10 Hz). For example, the AVOMC 310 may identify a vehicle control action many times, such as ten times, per second. The operational frequency of each component of the autonomous vehicle operational management system 300 may be synchronized or unsynchronized, and the operational rate of one or more of the AVOMC 310, the operational environment monitors 320, or the SSOCEMs 330 may be independent of the operational rate of others.

As may be clear from the above description, these models are complex, and their outcomes are difficult to assess. The teachings herein access a representation of the policy (or strategy) adopted by the vehicle that can be used to determine what factors corroborated the decision that the AV will take. The determinations can be used for modification of the decision-making policy to address difficult vehicle operation scenarios.

Figure 4:
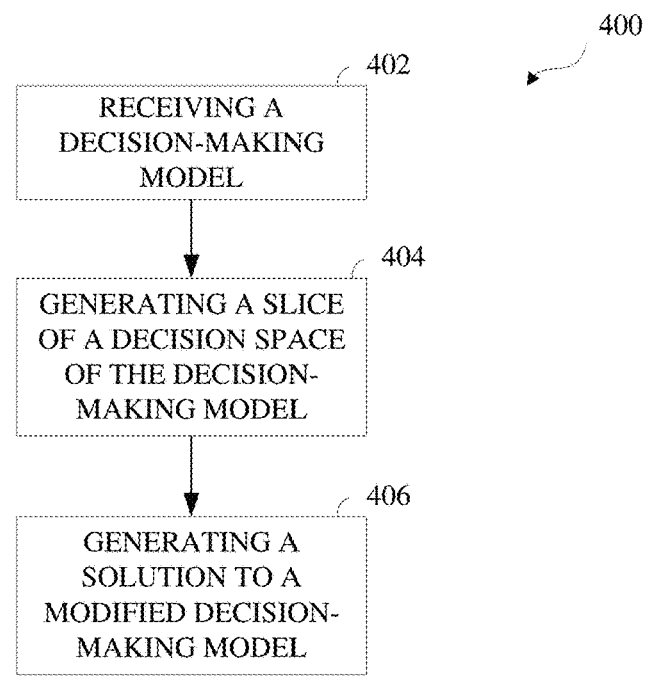
FIG. 4 is a flow chart of a method for post-processing a decision-making model of an autonomous vehicle according to the teachings herein.

FIG. 4 is a flow chart of a method 400 for post-processing a decision-making model of an autonomous vehicle according to the teachings herein. The method may be performed by a computer, processor, a controller, or any combination of hardware, with or without software. The method may be performed by the AV, such as by the processor 133, or may be performed remotely, such as by a processor or other hardware and optionally software at remote assistance support incorporating communication device 240.

At 402, a decision-making model is received that includes a plurality of states. The decision-making model may be received from a remote source that designed, processed, or otherwise generated the decision-making model. The decision-making model may be stored in a memory, such as the memory 134 or memory at the remote source, and receiving the decision-making model at 402 can include receiving the decision-making model from the memory.

As mentioned, the decision-making model includes a plurality of states. The decision-making model is also processed, designed, solved, or otherwise manipulated using multivariate data. The multivariate data comprises values for at least three observations of a vehicle operational scenario. Hence, the decision-making model may comprise any one of the AVOMC 310, a SSOCEM 330, or any combination of SSOCEMs 330, alone or in combination with the AVOMC 310. In some implementations, the decision-making model comprises a single POMDP or another sequential decision-making model of a SSOCEM 330. The method may be performed for multiple decision-making models.

Figure 5:
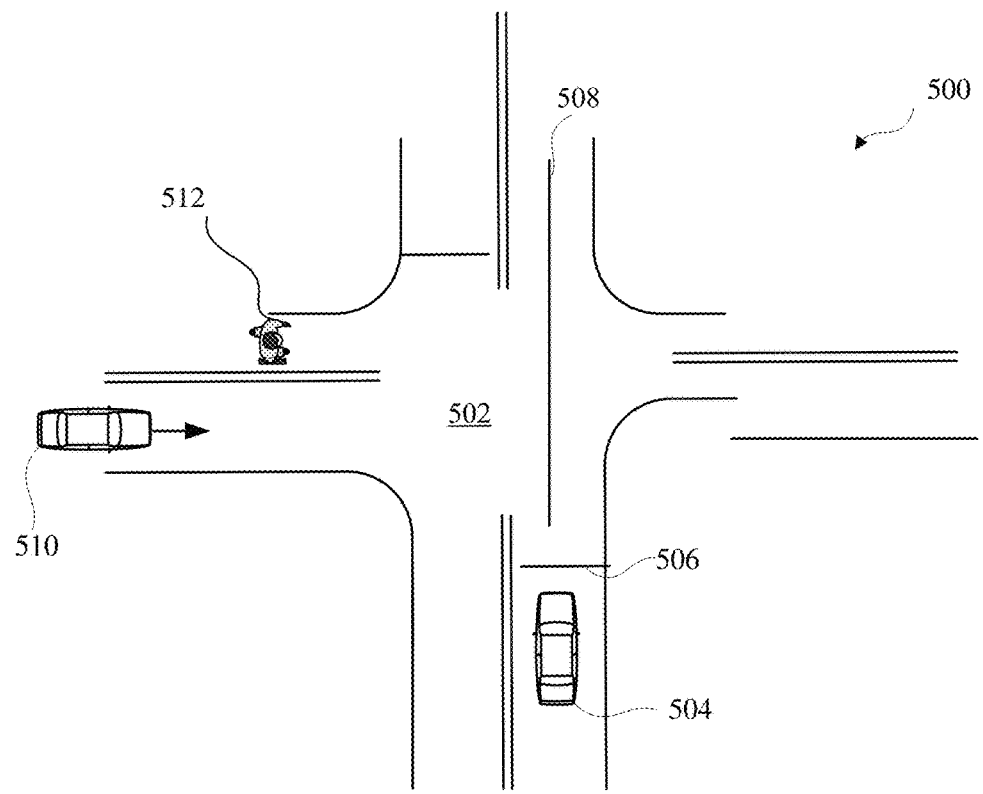
FIG. 5 is a diagram of an example of a vehicle operational scenario for which a decision-making model generates a solution.

FIG. 5 is a diagram of an example of a vehicle operational scenario 500 for which a decision-making model generates a solution, also referred to as a decision herein. This example is used to explain how the teachings herein would apply to a model.

The operational scenario 500 illustrates an intersection 502. A vehicle 504 is approaching the intersection 502. A stop line 506 (e.g., a stop sign) is a line where the vehicle 504 may stop or yield to ensure that it can safely proceed along a trajectory 508 (i.e., a path). The goal of the vehicle 504 is to safely traverse the intersection 502 from the current side of the vehicle 504 to the other side. The vehicle 504 can be the vehicle 100 of FIG. 1. The vehicle 504 can be one of the vehicles 210/211 of FIG. 2. The vehicle 504 can include an autonomous vehicle operational management system, such as the autonomous vehicle operational management system 300 of FIG. 3. As such, the vehicle 504 can be an autonomous vehicle or can be a semi-autonomous vehicle.

The operational scenario 500 also includes a vehicle 510 that is approaching the intersection 502 from the left side of the vehicle 504. Further, a pedestrian 512 is crossing the intersection 502 along the same direction as the vehicle 510.

The vehicle 510 has the right of way and does not have a stop sign. Thus, vehicle 510 can proceed through the interaction without stopping first. However, the vehicle 510 may begin slowing down to a stop before crossing the path of the vehicle 504. Thus, the intersection 502 may appear as a T-like intersection with respect to the vehicle 504.

The decision-making model inputs include multiple observations, two in some implementations and at least three in others. In the operational scenario 500, for example, the observations may include a proximity of the AV, here the vehicle 504, to the intersection 502, a proximity of a second vehicle, here the vehicle 510, to the intersection 502, and a priority of the AV relative to the second vehicle. In this example, the pedestrian 512 is also relevant to the decision-making model. Accordingly, another observation may be the proximity of the pedestrian 512 to the intersection 502, the vehicle 504, or both. The observations can include those that would be available from an operational environment monitor 320. For example, the observations can include a probability of availability, or corresponding blocking probability, for one or more portions of the vehicle transportation network as described with regards to the blocking monitor 321 above, which indicates a probability or likelihood that the autonomous vehicle may traverse the portion safely, that is, unimpeded by an external object such as a remote vehicle (the vehicle 510 in the example of FIG. 5) or a pedestrian (the pedestrian 512 in the example of FIG. 5).

The observations relevant to an operational scenario can differ by scenario. For example, a lane change scenario may include observations such as the proximities of a vehicle in an adjacent lane before and after the location of the AV. Scenarios can also use the same observations for a model. For example, the proximity of the second vehicle to the location of the maneuver, the intersection 502 in the operational scenario 500, may be equally applicable when the scenario (and hence the maneuver) is a lane change (e.g., the proximity of the second vehicle to the AV, where the second vehicle is the location of the maneuver).

In the operational scenario 500, which is an intersection scenario, the decision-making model can generate a solution using the observations. The solution may be a decision of what the vehicle 504 is to do when it reaches the intersection 502. For example, the solution may be a decision to stop the vehicle, a decision for the vehicle to proceed, or a decision to edge the vehicle (e.g., stop, edge, and stop again). The solution may be the optimal decision from multiple candidate decisions or actions. That is, for example, candidate decisions or actions may be ranked using the reward function described above such that the optimal decision (i.e., the solution or final state) is the candidate that results in the highest accrued reward over a given horizon length (e.g., the consideration of the future effects of each combination of state and action for a defined distance or length of time).

Referring back to FIG. 4, the method 400 includes generating a slice of a decision space of the decision-making model at 404. Generating the slice at 404 can include fixing values of all except two observations related to the operational scenario and modifying the values of the two observations to obtain multiple alternative solutions for the decision-making model (e.g., alternative policies of an POMDP). The multiple alternative solutions and the modified values form the slice of the decision space, and each of the multiple alternative solutions is associated with a respective first value of a first observation of the two observations and a respective second value of a second observation of the two observations.

Figures 6A, 6B:
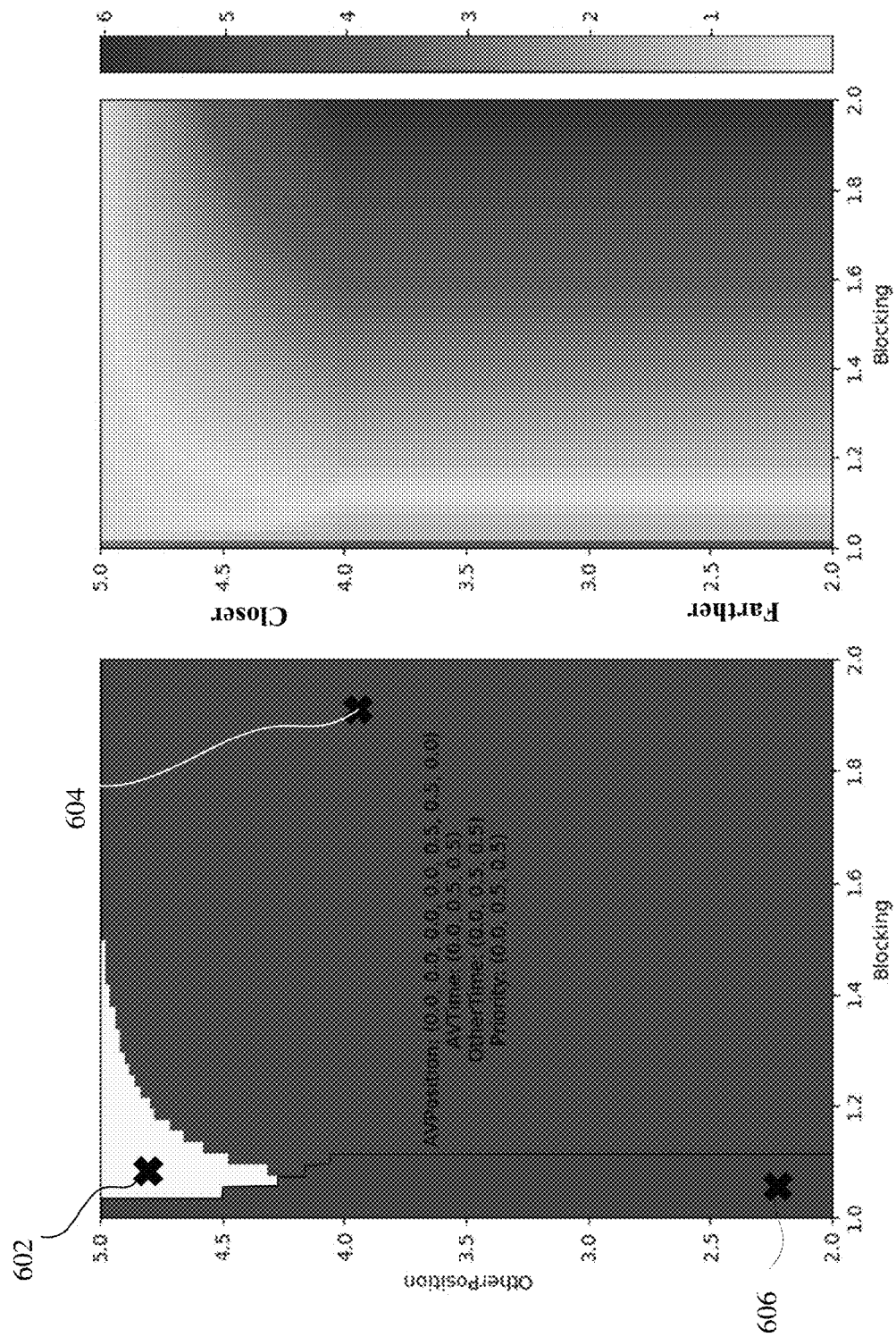
FIGS. 6A and 6B are graphical representations of a slice of a decision-making model decision space where

This can be demonstrated with reference first to FIG. 6A, where FIG. 6A is a graph representing the optimal solution for varying values of two observations. In this example, the X axis (labeled "Blocking") comprises values (also called modified values) for a blocking observation. The blocking observation is described above, and represents a probability or likelihood that a vehicle may traverse a portion of the vehicle transportation system safely. In this example, the portion is an intersection such as the intersection 502 of FIG. 5. The Y axis (labeled "OtherPosition") comprises values (also called modified values) for the proximity of another vehicle to the intersection, such as the proximity of the vehicle 510 to the intersection 502 of FIG. 5. It is worth noting that the example of FIG. 5 is used to explain certain terms herein, and does not necessarily correspond to the results shown in FIGS. 6A-8.

The units for each axis are not particularly limiting, but it is desirable if they are consistent for each observation. For example, the units may be in seconds, which is a common measurement used in autonomous vehicle operational management controllers such as the autonomous vehicle operational management controller 310 and its associated models. In FIG. 6A, lower values on the X axis indicate a lower likelihood of the vehicle being blocked while attempting to pass through the intersection, while higher values indicate a higher likelihood of the vehicle being blocked while attempting to pass through the intersection. Lower values on the Y axis indicate that the other vehicle is farther away from the intersection, while higher values indicate that the other vehicle is closer to the intersection.

By modifying, varying, or otherwise changing the values for blocking and the proximity of the other vehicle, the decision-making model outputs alternative solutions, each of which is the optimum decision or solution for the inputs (e.g., as determined using a reward function). That is, the intersection of a value for the blocking observation and a value for the proximity of the other vehicle to the intersection is an alternative solution of the decision-making model. As shown in FIG. 6A, a first intersection point 602 is located in a (e.g., contiguous) region where the alternative solutions all indicate to edge (e.g., go slowly). For example, the first intersection point 602 may be associated with observations that the other vehicle is relatively close to the intersection, but there is only a 15% chance that it will block the path of the AV through the intersection. A second intersection point 604 is located in a (e.g., contiguous) region where the alternative solutions all indicate to stop. For example, the second intersection point 604 may be associated with observations that the other vehicle is farther from the intersection than the first intersection point 602, but the likelihood that the path of the AV through the intersection is blocked is 90%. A third intersection point 606 is located in a (e.g., contiguous) region where the alternative solutions all indicate to proceed. For example, the third intersection point 606 may be associated with observations that the other vehicle is relatively far from the intersection (i.e., farther from the intersection than the second intersection point 604, and the likelihood that the path of the AV through the intersection is blocked is less than 15% (i.e., less than the first intersection point 602).

As mentioned above, other observations of the operational scenario (i.e., other than the blocking observation and the proximity of the other vehicle to the intersection) are fixed. FIG. 6A indicates values for the remaining observations. Namely, the proximity of the AV relative to the intersection ("AVPosition"), the amount of time the AV remains at AVPosition ("AVTime"), the amount of time the other vehicle remains at the position ("OtherPosition"), and the priority of the AV relative to the other vehicle at the intersection ("Priority") are fixed such that, for example, the probability of each occurring is 50% (0.5) given the range of values for each.

A graph of a slice, as described by example with respect to FIG. 6A and FIG. 7A below, may be rendered on a user interface, such as a display.

FIG. 6A shows one possible slice of the decision space of a decision-making model. Generating a slice may occur for each unique pair of observations. For example, when there are three observations, a first slice may be generated by modifying the first and second observations while fixing the third observation, a second slice may be generated by modifying the first and third observations while fixing the second observation, a third slice may be generated by modifying the first and second observations while fixing the third observation, and a fourth slice may be generated by modifying the second and third observations while fixing the first observation.

Figures 7A, 7B:
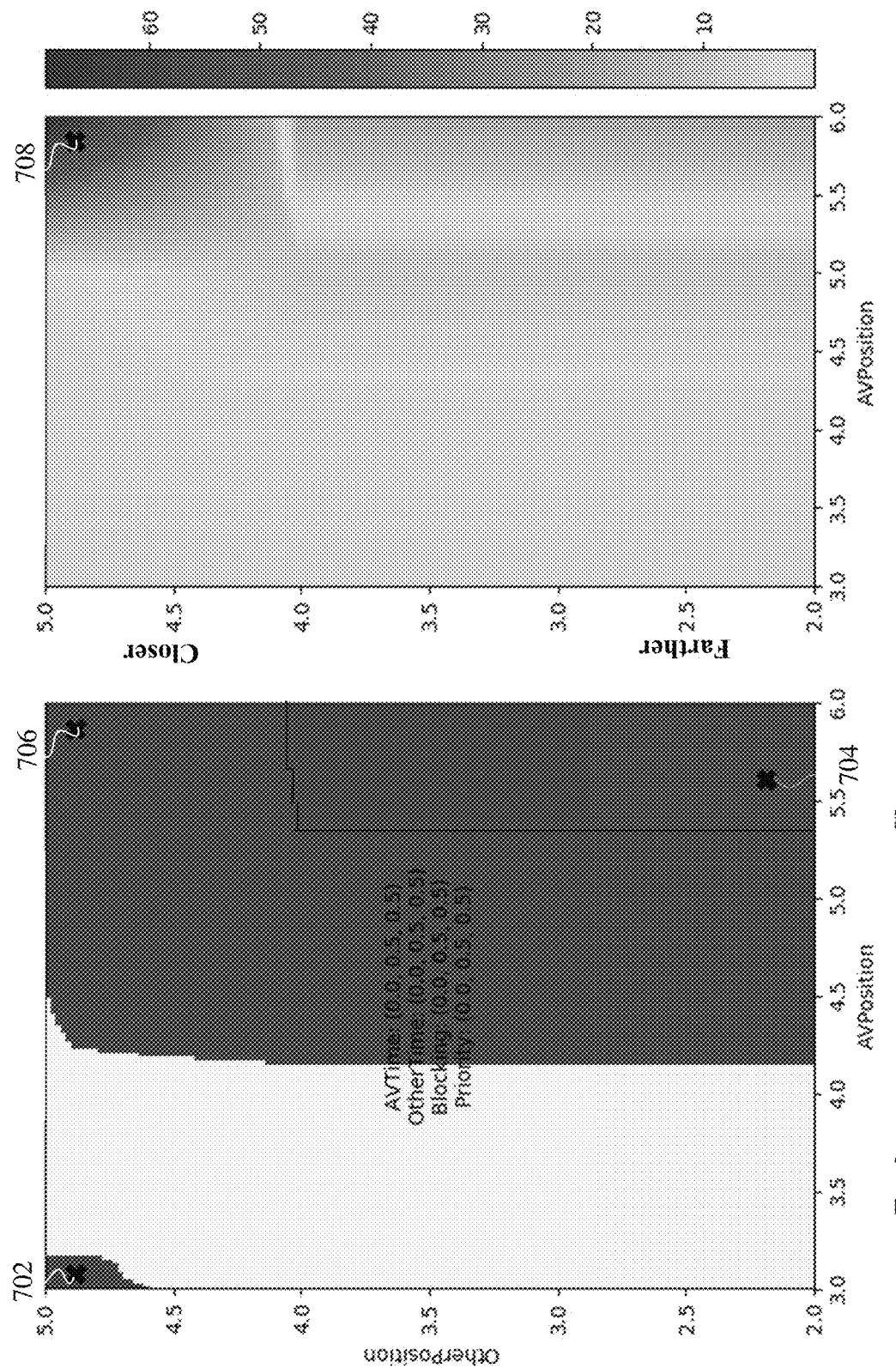
FIGS. 7A and 7B are graphical representations of another slice of a decision-making model decision space where

FIG. 7A is a graph representing the optimal solution for varying values of two observations. More specifically, FIG. 7A is a visualization of another slice of the decision space of a decision-making model for an intersection that may be generated according to the teachings herein. In this example, generating the slice at 404 includes fixing values of all except two observations—the proximity of the AV to the intersection "AVPosition") and the proximity of the other vehicle to the intersection—that are related to the operational scenario. These two values are modified, varied, or otherwise changed (e.g., between respective ranges for the values) to obtain multiple alternative solutions for the decision-making model (e.g., alternative policies of an POMDP). As described above with regards to FIG. 6A, the multiple alternative solutions and the modified values form the slice of the decision space, and each of the multiple alternative solutions is associated with a respective first value of a first observation of the two observations and a respective second value of a second observation of the two observations.

In FIG. 7A, the X axis comprises values (also called modified values) for the proximity of the AV to the intersection, such as the proximity of the vehicle 504 to the intersection 502 of FIG. 5. The Y axis comprises values (also called modified values) for the proximity of the other vehicle to the intersection, such as the proximity of the vehicle 510 to the intersection 502 of FIG. 5. The lower values on the X axis indicate that the AV is farther away from the intersection, while higher values indicate that the AV is closer to the intersection. Lower values on the Y axis indicate that the other vehicle is farther away from the intersection, while higher values indicate that the other vehicle is closer to the intersection.

By modifying, varying, or otherwise changing the values for the proximities, the decision-making model outputs alternative solutions, each of which is the optimum decision or solution for the inputs (e.g., as determined using a reward function). That is, the intersection of a value for the proximity of the AV to the intersection and a value for the proximity of the other vehicle to the intersection is an alternative solution of the decision-making model. As shown in FIG. 7A, for example, a first intersection point 702 is located in a (e.g., contiguous) region where the alternative solutions all indicate that the AV should proceed. For example, the first intersection point 702 may be associated with observations that the other vehicle is within to the intersection, but the AV is far from the intersection. A proceed is indicated because the other vehicle is most likely to be out of the intersection before the AV enters it. A second intersection point 704 is similarly located in a (e.g., contiguous) region where the alternative solutions all indicate to proceed. The second intersection point 704 is associated with observations that the other vehicle is relatively far from the intersection, and the AV is close to (or within) the intersection. A proceed is indicated because the other vehicle is unlikely to reach the intersection before the AV exits it. A third intersection point 706 is located in a (e.g., contiguous) region where the alternative solutions all indicate for the AV to stop. The third intersection point 706 may be associated with observations that both vehicles are in the intersection. Another region shown in FIG. 7A, generally to the left of the "STOP" region, corresponds to the decision or solution that the AV should edge.

Other observations of the operational scenario (i.e., other than the proximity observationsy of the other vehicle to the intersection) are fixed. FIG. 7A indicates values for the remaining observations. Namely, the probability that the AV will be blocked from passing through the intersection ("Blocking"), the amount of time the AV remains at AVPosition ("AVTime"), the amount of time the other vehicle remains at the position ("OtherPosition"), and the priority of the AV relative to the other vehicle at the intersection ("Priority") are fixed such that, for example, the probability of each occurring is 50% (0.5) given the range of values for each.

Other useful information is available from the alternative solutions, which can be seen by reference to FIGS. 6B and 7B. For example, the method 400 can include, for an alternative solution of the multiple alternative solutions for the decision-making model, determining the value to the next best solution. The alternative solution is the optimal decision or solution for the decision-making model given the inputs—the solution with the highest probability that the AV will successfully navigate the vehicle operational scenario, such as successfully traversing the intersection. The next best solution is the solution that has the second highest probability that the AV will successfully navigate the vehicle operational scenario given the same inputs. Thus, the value can be the difference in the probabilities or some other value associated with each of the two solutions. In some implementations, the value to the next best solution is a difference between an output of a reward function for the alternative solution and an output of a reward function for the next best solution. This information is useful because it can indicate how much risk is incurred if the decision-making model is modified such that the next best solution is selected as the optimal solution.

The method 400 can also include generating a graph, which may be presented on a user interface such as a display, the graph having a first axis comprising the modified values of the first observation, and a second axis comprising the modified values of the second observation. The graph displays a respective value to the next best solution for each of the alternative solutions. Example of such graphs are shown in FIGS. 6B and 7B. FIG. 6B is a graph representing the value to the next best solution for the two observations of FIG. 6A, and FIG. 7B is a graph representing the value to the next best solution for the two observations of FIG. 7A.

As can be seen with reference to FIGS. 6B and 7B, the value to the next best solution is generally smallest at borders between adjacent solution regions, and increases as the modified values move away from their values at the borders. The values to the next best solution become very high when the risk of the next best solution is prohibitive. This is illustrated by the intersection point 708 in FIG. 7B, which is co-located with the third intersection point 706 of FIG. 7A. That is, the intersection points 706 and 708 have the same inputs, with the same modified values for the proximities. As described above, the third intersection point 706 may illustrate conditions or observations where both vehicles are in the intersection. The relatively high value to the next best solution here, where the optimal solution is "STOP", indicates that the next best solution could be very dangerous. That is, the next best solution is likely "EDGE", which could cause a collision within the intersection if both vehicles are within or entering the intersection.

Referring back to FIG. 4, the method 400 can also include generating a solution to a modified decision-making model at 406. The modified decision-making model can be the decision-making model modified by, for at least one state and at least one of the two observations, modifying at least one of a probabilistic transition matrix or a probabilistic observation matrix of the decision-making model. That is, probabilities of the decision-making model may be modified using the results of one or more of the slices of the decision space of the decision-making model. In this way, at least one of the optimal decisions or solutions for a set of observations could change from that resulting from the decision-making model before modification.

Modifying the probabilistic transition matrix of the decision-making model can include modifying a probability that the state results based on a change in value of the observation of the at least three observations. Modifying the probability may be achieved by modifying one or more of the state transition probabilities described above. Modifying the probabilistic observation matrix of the decision-making model may include modifying a probability that a value of the observation of the at least three observations exists at the state. Modifying the probability may be achieved by modifying one or more of the conditional observation probabilities described above.

Figure 8:
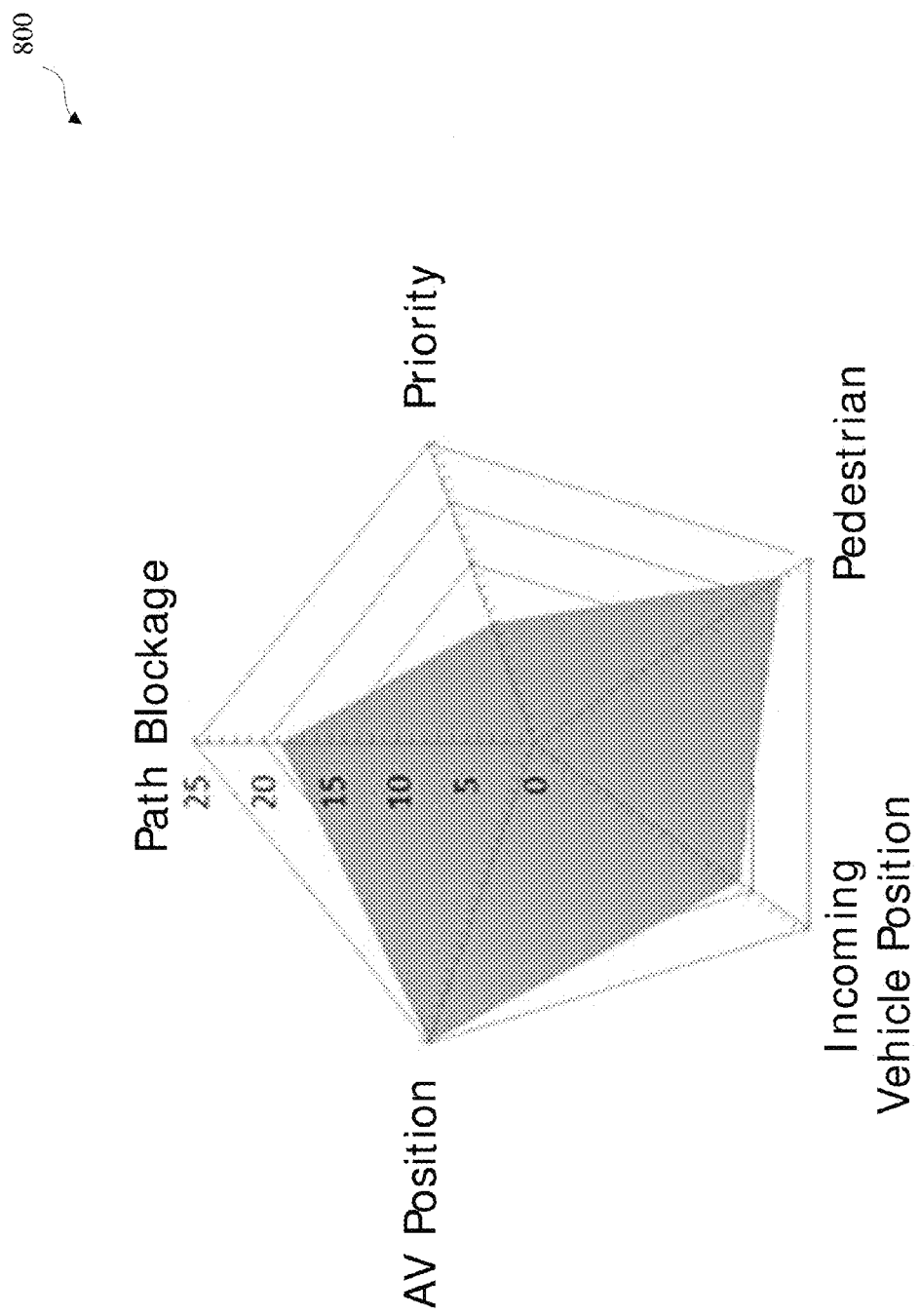
FIG. 8 is a radar chart of a solution of a decision-making model.

In some implementations, the decision-making model may be processed to generate a baseline solution. The term baseline solution indicates that the solution is the output of a decision-making model before modification. FIG. 8 is a radar graph or chart 800 of a solution of a decision-making model. In the radar graph 800, the baseline solution may be graphed where each of the at least three observations is represented on a separate axis. In the example of FIG. 8, the observations include blockage, the proximity of the AV to an intersection, the proximity of a second vehicle to the intersection, the proximity of a pedestrian to the intersection, the priority of the AV relative to the second vehicle, and the blockage value as described by example previously. The axes are equidistantly-spaced and equal in length because the values are normalized to the same units. However, axes with different spacing and/or lengths are possible. Multiple solutions may be separately graphed so as to produce multiple polygons, and the appearance of a polygon can depend upon the decision or solution. For example, polygons of the radar charts associated with a first baseline solution of the plurality of baseline solutions may be distinguished from polygons of the radar charts associated with a second baseline solution by a display element comprising a color, a fill, a line connecting data values for each spoke, or some combination of these elements.

The disclosure herein supports decision making in autonomous vehicles by analyzing and potentially modifying models to favor one solution over another based on the factors that most contribute to a solution. The techniques described herein may be used in further processes for validation, regulatory compliance, troubleshooting, etc.

More specifically, for example, the current logic behind decision-making processes can make it difficult to extend the range of use cases tackled by a singular method. This is because of the difficulty in the assessment of the capacities of the system. This proves particularly true when solving edge cases, for which instances are relatively rare. Through the generation of slices, and optionally when coupled with the graphical representations described herein, a representation of the policy (or strategy) adopted by the AV is formed in order to determine which factors corroborated the decision that the AV took. This fosters transparency that can aid the development of models, expansion of models towards new use cases, more accurate categorization of difficult cases, such as edge cases, and fine tuning of the AV decision making process.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

The invention claimed is:

1. An apparatus for post-processing of a decision-making model for use by an autonomous vehicle, the apparatus comprising:
  a processor configured to:
    receive a decision-making model comprising a plurality of states, wherein the decision-making model generates a solution using multivariate data, the multivariate data comprises values for at least three observations of a vehicle operational scenario, and the solution includes an action for vehicle control during the vehicle operational scenario;
    generate a slice of a decision space of the decision-making model, wherein to generate the slice comprises to:
      fix values of all except two observations of the at least three observations; and
      modify the values of the two observations to obtain multiple alternative solutions for the decision-making model, wherein the multiple alternative solutions and the modified values form the slice of the decision space, and each of the multiple alternative solutions is associated with a respective first value of a first observation of the two observations and a respective second value of a second observation of the two observations;

modify, using the slice, the decision-making model to generate a modified decision-making model, wherein to modify the decision-making model comprises, for at least one state and at least one of the two observations, modifying at least one of a probabilistic transition matrix or a probabilistic observation matrix of the decision-making model such that a solution of the modified decision-making model for a set of values for the at least three observations differs from a solution of the decision-making model for the set of values; and control, using the modified decision-making model, the autonomous vehicle while traversing a vehicle transportation system.

2. The apparatus of claim 1, wherein:
the decision-making model comprises a Partially Observable Markov Decision Process model.

3. The apparatus of claim 1, further comprising:
a display, wherein the processor is configured to graph the slice of the decision space in two dimensions on the display, a first axis of the graph comprising the modified values of the first observation, and a second axis of the graph comprising the modified values of the second observation, and wherein the graph displays an indication of respective alternative solutions for combinations of at least some of the modified values of the first observation and the modified values of the second observation.

4. The apparatus of claim 1, wherein to the processor is configured to, for an alternative solution of the multiple alternative solutions for the decision-making model:
determine a value to a next best solution of the decision-making model for the modified value for the first observation and the modified value for the second observation that are associated with the alternative solution, wherein the value to the next best solution is a difference between an output of a reward function for the alternative solution and an output of a reward function for the next best solution.

5. The apparatus of claim 4, further comprising:
a display, wherein the processor is configured generate a graph having a first axis comprising the modified values of the first observation, and a second axis comprising the modified values of the second observation, the graph displaying a respective value to the next best solution for each of the alternative solutions.

6. The apparatus of claim 1, further comprising:
memory storing the decision-making model, wherein the processor is configured to receive the decision-making model from the memory.

7. The apparatus of claim 1, wherein the processor is configured to:
generate a second slice of the decision space of the decision-making model, wherein to generate the second slice comprises to:
fix values of all observations of the at least three observations except for the first observation and a third observation of the at least three observations that is different from the first observation and the second observation; and
modify the values of the first observation and the third observation to obtain multiple second alternative solutions for the decision-making model, wherein the multiple second alternative solutions and the modified values form the second slice of the decision space, and each of the multiple second alternative solutions is associated with a respective first value of the first observation and a respective third value of the third observation.

8. The apparatus of claim 1, wherein:
the vehicle operational scenario comprises an intersection, and
the at least three observations of the vehicle operational scenario comprise a proximity of the autonomous vehicle to the intersection, a proximity of a second vehicle to the intersection, and a priority of the autonomous vehicle relative to the second vehicle.

9. The apparatus of claim 1, wherein:
the processor is configured to process the decision-making model to generate a baseline solution, and
the apparatus further comprises:
a display, wherein the processor is configured to graph the baseline solution using a radar chart, at least some of the at least three observations represented a respective separate axis.

10. The apparatus of claim 9, wherein:
the baseline solution is one a plurality of baseline solutions generated using the decision-making model;
the processor is configured to graph each of the baseline solutions using a respective radar chart having equidistantly-spaced axes; and
polygons of the radar charts associated with a first baseline solution of the plurality of baseline solutions are distinguished from polygons of the radar charts associated with a second baseline solution by a display element comprising at least one of a color, a fill, or a line connecting data values for each spoke.

11. An apparatus for post-processing of a decision-making model for use by an autonomous vehicle, the apparatus comprising:
a processor configured to:
receive a decision-making model comprising a plurality of states, wherein the decision-making model generates a solution using multivariate data, the multivariate data comprises values for at least three observations of a vehicle operational scenario, and the solution includes an action for vehicle control during the vehicle operational scenario;
for each unique pair of the at least three observations:
generate a slice of a decision space of the decision-making model, wherein to generate the slice comprises to:
fix values of all of the at least three observations except for the unique pair; and
modify the values of the unique pair to obtain multiple alternative solutions for the decision-making model, wherein the multiple alternative solutions and the modified values form the slice of the decision space, and each of the multiple alternative solutions is associated with a respective first value of a first observation of the unique pair and a respective second value of a second observation of the unique pair;
modify the decision-making model to generate a modified decision-making model by, for a state and an observation of the at least three observations, modifying at least one of a probabilistic transition matrix or a probabilistic observation matrix of the decision-making model such that a solution of the modified decision-making model for a set of values for the at least three observations differs from a solution of the decision-making model for the set of values; and control, using the modified decision-making model, the autonomous vehicle while traversing a vehicle transportation system.

12. The apparatus of claim 11, wherein the solution comprises one of a decision to stop the autonomous vehicle, a decision for the autonomous vehicle to proceed, or a decision to edge the autonomous vehicle.

13. The apparatus of claim 11, further comprising:
a display, wherein the processor is configured to separately graph each slice of the decision space in two dimensions on the display, a first axis of the graph comprising the modified values of the first observation, and a second axis of the graph comprising the modified values of the second observation, and wherein the graph displays an indication of each alternative solution for combinations of the modified values of the first observation and the modified values of the second observation.

14. The apparatus of claim 11, further comprising:
modifying a probabilistic transition matrix of the decision-making model by, for a state and an observation of the at least three observations, modifying a probability that the state will result based on a change in value of the observation of the at least three observations.

15. The apparatus of claim 11, further comprising:
modifying a probabilistic observation matrix of the decision-making model by, for a state and an observation of the at least three observations, modifying a probability that a value of the observation of the at least three observations will exist at the state.

16. A method for post-processing of a decision-making model for use by an autonomous vehicle, the method comprising:
receiving a decision-making model comprising a plurality of states, wherein the decision-making model generates a solution using multivariate data, the multivariate data comprises values for at least three observations of a vehicle operational scenario, and the solution includes an action for vehicle control during the vehicle operational scenario;
generating a slice of a decision space of the decision-making model, wherein generating the slice comprises:
fixing values of all except a first observation and a second observation of the at least three observations; and
modifying the values of the first observation and the second observation to obtain multiple alternative solutions for the decision-making model, wherein the multiple alternative solutions and the modified values form the slice of the decision space, and each of the multiple alternative solutions is associated with a respective first value of the first observation and a respective second value of the second observation;
modifying the decision-making model to generate a modified decision-making model by, for at least one state and at least one of the first observation or the second observation, modifying at least one of a probabilistic transition matrix or a probabilistic observation matrix of the decision-making model such that a solution of the modified decision-making model for a set of values for the at least three observations differs from a solution of the decision-making model for the set of values; and controlling, using the modified decision-making model, the autonomous vehicle while traversing a vehicle transportation system.

17. The method of claim 16, wherein:
the vehicle operational scenario comprises an intersection,
the at least three observations of the vehicle operational scenario comprise a proximity of the autonomous vehicle to the intersection, a proximity of a second vehicle to the intersection, a proximity of a pedestrian, and a priority of the autonomous vehicle relative to the second vehicle, and
the at least three observations of the vehicle operational scenario are indicated in seconds.

18. The method of claim 16, further comprising:
generating a two-dimensional graph of the multiple alternative solutions, a first axis of the graph comprising the modified values of the first observation, and a second axis of the graph comprising the modified values of the second observation.

19. The method of claim 16, further comprising:
generating second slice of the decision space of the decision-making model, wherein generating the second slice comprises:
fixing values of all except the first observation and a third observation of the at least three observations; and
modify the values of the first observation and the third observation to obtain multiple second alternative solutions for the decision-making model, wherein the multiple second alternative solutions and the modified values form the second slice of the decision space, and each of the multiple second alternative solutions is associated with a respective first value of a first observation and a respective third value of the third observation.

20. The method of claim 19, further comprising:
generating a first two-dimensional graph of the multiple alternative solutions, a first axis of the first two-dimensional graph comprising the modified values of the first observation, and a second axis of the first two-dimensional graph comprising the modified values of the second observation; and
generating a second two-dimensional graph of the multiple second alternative solutions, a first axis of the second two-dimensional graph comprising the modified values of the first observation, and a second axis of the second two-dimensional graph comprising the modified values of the third observation.

* * * * *